US012783299B2

(12) United States Patent
Lu et al.

(10) Patent No.: US 12,783,299 B2
(45) Date of Patent: Nov. 3, 2026

(54) TASK PROCESSING METHOD, CHIP, MULTI-CHIP MODULE, ELECTRONIC DEVICE AND STORAGE MEDIUM

(71) Applicant: HYGON INFORMATION TECHNOLOGY CO., LTD., Binhai New Area (CN)

(72) Inventors: Yifan Lu, Binhai New Area (CN); Yu Pan, Binhai New Area (CN)

(73) Assignee: HYGON INFORMATION TECHNOLOGY CO., LTD., Binhai New Area (CN)

( * ) Notice: Subject to any disclaimer, the term of this patent is extended or adjusted under 35 U.S.C. 154(b) by 0 days.

(21) Appl. No.: 18/716,272

(22) PCT Filed: Sep. 14, 2023

(86) PCT No.: PCT/CN2023/118880

§ 371 (c)(1),
(2) Date: Jun. 4, 2024

(87) PCT Pub. No.: WO2024/187707

PCT Pub. Date: Sep. 19, 2024

(65) Prior Publication Data

US 2026/0169791 A1 Jun. 18, 2026

(30) Foreign Application Priority Data

Mar. 14, 2023 (CN) ......................... 202310243912.0

(51) Int. Cl.
*G06F 9/48* (2006.01)
*G06F 9/52* (2006.01)

(52) U.S. Cl.
CPC ............ *G06F 9/4881* (2013.01); *G06F 9/522* (2013.01)

(58) Field of Classification Search
CPC ...... G06F 9/4881; G06F 9/522; G06F 9/5038; G06F 15/7807; Y02D 10/00
See application file for complete search history.

(56) References Cited

U.S. PATENT DOCUMENTS 6,047,334 A 4/2000 Langendorf et al.
2019/0391856 A1 12/2019 Vasudevan
(Continued)

FOREIGN PATENT DOCUMENTS

CN 107250984 A 10/2017
CN 112231018 A 1/2021
(Continued)

OTHER PUBLICATIONS

International Search Report dated Nov. 23, 2023 for PCT Appn. No. PCT/CN2023/118880 filed Sep. 14, 2023, 9 pgs.
(Continued)

*Primary Examiner* — Craig C Dorais
(74) *Attorney, Agent, or Firm* — BROOKS KUSHMAN P.C.

(57) ABSTRACT

A task processing method for a multi-chip module, a task processing method for a chip, a chip, a multi-chip module, an electronic device, and a computer-readable storage medium. The task processing method for a multi-chip module includes: acquiring, by each chip, respective subqueue information related to a current task queue which includes a plurality of tasks arranged in an execution order and a synchronization command between the tasks, each of the tasks including N subtasks, and the N subtasks being configured to be executed by the N chips respectively; sequentially executing, by each chip, corresponding subtasks of the current task queue in accordance with the execution order; each chip, in response to executing to the synchronization command, confirming whether the N chips have all finished executing corresponding subtasks before the synchroniza-
(Continued)

tion command, and if yes, terminating the synchronization command to execute a corresponding subtask after the synchronization command.

19 Claims, 12 Drawing Sheets

(56) References Cited

U.S. PATENT DOCUMENTS

| | | | | |
|---|---|---|---|---|
| 2020/0117505 | A1* | 4/2020 | Chen | G06F 9/542 |
| 2020/0257652 | A1* | 8/2020 | Wang | G06F 9/4843 |
| 2021/0004278 | A1 | 1/2021 | Nishi et al. | |
| 2021/0073169 | A1 | 3/2021 | Wang et al. | |
| 2021/0263781 | A1* | 8/2021 | Gupta | G06F 9/5033 |

FOREIGN PATENT DOCUMENTS

| | | | |
|---|---|---|---|
| CN | 115145355 | A | 10/2022 |
| CN | 116339944 | A | 6/2023 |

OTHER PUBLICATIONS

European Search Report dated Feb. 24, 2025 for European Patent Application No. 23895530.6 filed Jun. 4, 2024, 10 pgs.

* cited by examiner

TASK PROCESSING METHOD, CHIP, MULTI-CHIP MODULE, ELECTRONIC DEVICE AND STORAGE MEDIUM

CROSS-REFERENCE TO RELATED APPLICATION

This application is a U.S. National Phase Entry of International Application No. PCT/CN2023/118880 filed on Sep. 14, 2023, which claims priority to Chinese Patent Application No. 202310243912.0 filed on Mar. 14, 2023, which are hereby incorporated herein by reference in their entireties.

TECHNICAL FIELD

Embodiments of the present disclosure relate to a task processing method for a multi-chip module, a task processing method for a chip, a chip, a multi-chip module, an electronic device, and a computer-readable storage medium.

BACKGROUND

As various needs continue to increase, chips are required to have higher processing capacity. DSA (Domain Specific Accelerators) chips are accelerators oriented to certain fields, which are extended based on general-purpose processing to improve the efficiency of solving problems in those fields, and include, for example, TPU (Tensor Processing Unit) chips, NPU (Neural-network Processing Unit) chips, and ASIC (Application Specific Integrated Circuit) chips for computation in specific application scenarios. Due to the demand diversity, the demand for a single chip is low. Moreover, reasonable allocation of the computing power is required, so it is possible to packet a specific DSA chip with other chips (e.g., a CPU (Central Processing Unit) chip, and a GPU (Graphics Processing Unit) chip) using interconnection technology, or it is possible to packet multiple CPUs or multiple GPUs together using interconnection technology. In addition, the yield of chips is also of concern. In the same process, an increase of the chip size leads to a lower yield. If a large chip is split into a plurality of small chips, then the yield of chips will be increased, thus reducing the cost of mass production. Therefore, multi-chip interconnected packaging technology is increasingly favored in the field. In a multi-chip interconnected architecture, how to carry out the task processing is an issue of concern.

SUMMARY

At least one embodiment of the present disclosure provides a task processing method for a multi-chip module, the multi-chip module includes N chips, the method includes: acquiring, by each of the N chips, respective subqueue information related to a current task queue, in which the current task queue includes a plurality of tasks arranged in an execution order and a synchronization command between the plurality of tasks, each of the plurality of tasks includes N subtasks, and the N subtasks are configured to be executed by the N chips respectively; sequentially executing, by each of the N chips, corresponding subtasks of the current task queue in accordance with the execution order based on the respective subqueue information; each of the N chips, in response to executing to the synchronization command, confirming whether the N chips have all finished executing corresponding subtasks before the synchronization command in the current task queue, and terminating the synchronization command to execute a corresponding subtask after the synchronization command in response to confirming that the N chips have all finished executing the corresponding subtasks before the synchronization command in the current task queue, in which N is an integer greater than 1.

For example, in the task processing method provided in an embodiment of the present disclosure, the N chips include a primary chip and at least one secondary chip; each of the N chips, in response to executing to the synchronization command, confirming whether the N chips have all finished executing corresponding subtasks before the synchronization command in the current task queue includes: each of the at least one secondary chip, in response to executing to the synchronization command, confirming whether the secondary chip itself has finished executing corresponding subtasks before the synchronization command; sending, by each of the at least one secondary chip, a first synchronization signal to the primary chip in response to confirming that the secondary chip itself has finished executing corresponding subtasks before the synchronization command; and terminating, by each of the at least one secondary chip, the synchronization command in response to receiving a second synchronizing signal sent by the primary chip; in which the second synchronization signal indicates that the primary chip has received the first synchronization signal sent by all of the at least one secondary chip.

For example, in the task processing method provided in an embodiment of the present disclosure, each of the N chips, in response to executing to the synchronization command, confirming whether the N chips have all finished executing corresponding subtasks before the synchronization command in the current task queue includes: confirming, by the primary chip, whether the primary chip has finished executing corresponding subtasks before the synchronization command in response to the primary chip executing to the synchronization command; checking, by the primary chip, whether the first synchronization signal sent by all of the at least one secondary chip has been received in response to confirming that the primary chip has finished executing corresponding subtasks before the synchronization command; and sending, by the primary chip, the second synchronization signal to each of the at least one secondary chip and terminating the synchronization command in a case where the first synchronization signal sent by all of the at least one secondary chip has been received.

For example, in the task processing method provided in an embodiment of the present disclosure, each of the at least one secondary chip has a secondary synchronization register related to the current task queue, the secondary synchronization register includes a bit corresponding to the secondary chip and a bit corresponding to the primary chip, and the bit corresponding to the secondary chip and the bit corresponding to the primary chip both have an initial value; for each of the at least one secondary chip, that sending a first synchronization signal to the primary chip in response to confirming that the secondary chip itself has finished executing corresponding subtasks before the synchronization command includes: in response to confirming that the secondary chip itself has finished executing corresponding subtasks before the synchronization command, changing the bit, corresponding to the secondary chip, in the secondary synchronization register from the initial value to a target value, and sending the first synchronization signal to the primary chip; terminating the synchronization command in response to receiving a second synchronizing signal sent by the primary chip includes: in response to receiving the second synchronization signal sent by the primary chip, changing the bit, corresponding to the primary chip, in the secondary synchronization register from the initial value to the target value; and querying value of the secondary synchronization register, and terminating the synchronization command in a case where the bit corresponding to the secondary chip and the bit corresponding to the primary chip in the secondary synchronization register are both the target value.

For example, in the task processing method provided in an embodiment of the present disclosure, the primary chip has a primary synchronization register related to the current task queue, the primary synchronization register includes N bits corresponding to the N chips respectively, and the N bits each have an initial value; for the primary chip, that checking whether the first synchronization signal sent by all of the at least one secondary chip has been received in response to confirming that the primary chip has finished executing corresponding subtasks before the synchronization command includes: in response to confirming that the primary chip has finished executing corresponding subtasks before the synchronization command, changing a bit, corresponding to the primary chip, in the primary synchronization register from the initial value to a target value, and changing a bit, corresponding to a secondary chip, in the primary synchronization register from the initial value to the target value after receiving the first synchronization signal sent by the secondary chip, until the N bits of the primary synchronization register are all changed to the target value after receiving the first synchronization signal sent by all of the at least one secondary chip; and querying value of the primary synchronization register, and confirming that the first synchronization signal sent by all of the at least one secondary chip has been received in a case where all the N bits of the primary synchronization register are the target value.

For example, in the task processing method provided in an embodiment of the present disclosure, the N chips are configured to communicate with a task initiator. The task processing method further includes: each of the N chips, after completing a corresponding subtask of each task in the current task queue, sending a completion message to the task initiator to cause the task initiator to confirm whether each task is completed.

For example, in the task processing method provided in an embodiment of the present disclosure, the current task queue includes a first task, and the task initiator initializes task state of the first task as a value. Each of the N chips, after completing a corresponding subtask of each task in the current task queue, sending a completion message to the task initiator to cause the task initiator to confirm whether each task is completed includes: each of the N chips, after completing a corresponding subtask of the first task, performing a computing operation on the task state to change the value of the task state until, after all the N chips have performed the computing operation, the task state is changed to a completion value, to cause the task initiator to confirm whether the first task is completed based on whether the task state is the completion value.

At least one embodiment of the present disclosure provides a task processing method for a chip, including: acquiring subqueue information related to a current task queue, in which the current task queue includes a plurality of tasks arranged in an execution order and a synchronization command between the plurality of tasks, each of the plurality of tasks includes N subtasks, and the N subtasks are configured to be executed by the chip and (N−1) associated chips respectively; sequentially executing corresponding subtasks of the current task queue in accordance with the execution order based on the subqueue information; in response to executing to the synchronization command, confirming whether the chip and the (N−1) associated chips have all finished executing corresponding subtasks before the synchronization command in the current task queue; and in response to confirming that the chip and the (N−1) associated chips have all finished executing the corresponding subtasks before the synchronization command in the current task queue, terminating the synchronization command to execute a corresponding subtask after the synchronization command, in which N is an integer greater than 1.

For example, in the task processing method provided in an embodiment of the present disclosure, in a case where the (N−1) associated chips include a primary chip and the chip is a secondary chip related to the primary chip, in response to executing to the synchronization command, confirming whether the chip and the (N−1) associated chips have all finished executing corresponding subtasks before the synchronization command in the current task queue includes: in response to executing to the synchronization command, confirming whether the chip has finished executing corresponding subtasks before the synchronization command; in response to confirming that the chip has finished executing corresponding subtasks before the synchronization command, sending a first synchronization signal to the primary chip; and in response to receiving a second synchronizing signal sent by the primary chip, terminating the synchronization command; in which the second synchronization signal indicates that the primary chip has received the first synchronization signal sent by all the secondary chip related to the primary chip.

For example, in the task processing method provided in an embodiment of the present disclosure, in a case where the chip is a primary chip and each of the (N−1) associated chips is a secondary chip of the primary chip, in response to executing to the synchronization command, confirming whether the chip and the (N−1) associated chips have all finished executing corresponding subtasks before the synchronization command in the current task queue includes: in response to executing to the synchronization command, confirming whether the chip has finished executing corresponding subtasks before the synchronization command; in response to confirming that the chip has finished executing corresponding subtasks before the synchronization command, checking whether first synchronization signals sent by all of the (N−1) associated chips has been received; and sending a second synchronization signal to each of the (N−1) associated secondary chips and terminating the synchronization command in a case where the first synchronization signals sent by all of the (N−1) associated chips have been received.

At least one embodiment of the present disclosure provides A chip, including a command processor and a task processing apparatus, the command processor is configured to acquire subqueue information related to a current task queue, in which the current task queue includes a plurality of tasks arranged in an execution order and a synchronization command between the plurality of tasks, each of the plurality of tasks includes N subtasks, and the N subtasks are configured to be executed by the chip and (N−1) associated chips respectively; the task processing apparatus is configured to sequentially execute corresponding subtasks of the current task queue in accordance with the execution order based on the subqueue information. The command processor is further configured to: in response to executing to the synchronization command, confirm whether the chip and the (N−1) associated chips have all finished executing corresponding subtasks before the synchronization command in the current task queue; and in response to confirming that the chip and the (N−1) associated chips have all finished executing the corresponding subtasks before the synchronization command in the current task queue, terminate the synchronization command to execute a corresponding subtask after the synchronization command, N is an integer greater than 1.

At least one embodiment of the present disclosure provides a multi-chip module, including N chips, each of the N chips is configured to: acquire subqueue information related to a current task queue, in which the current task queue includes a plurality of tasks arranged in an execution order and a synchronization command between the plurality of tasks, each of the plurality of tasks includes N subtasks, and the N subtasks are configured to be executed by the N chips respectively; sequentially execute corresponding subtasks of the current task queue in the execution order based on the respective subqueue information; and in response to executing to the synchronization command, confirm whether the N chips have all finished executing corresponding subtasks before the synchronization command in the current task queue, and in response to confirming that the N chips have all finished executing the corresponding subtasks before the synchronization command in the current task queue, terminate the synchronization command to execute a corresponding subtask after the synchronization command, N is an integer greater than 1.

At least one embodiment of the present disclosure provides an electronic device, including: a task initiator; and the multi-chip module according to at least one embodiment of the present disclosure.

At least one embodiment of the present disclosure provides an electronic device, including: a processor; and a memory, storing one or more computer program modules; the one or more computer program modules are configured to be executed by the processor to implement the task processing method according to any embodiment of the present disclosure.

At least one embodiment of the present disclosure provides a computer-readable storage medium, storing a non-transitory computer-readable instruction, the non-transitory computer-readable instruction, when executed by a computer, implements the task processing method according to any embodiment of the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description relate to merely some embodiments of the present disclosure and are not intended to limit the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relevant position relationship, and when the position of the object which is described is changed, the relevant position relationship may be changed accordingly.

Figure 1:
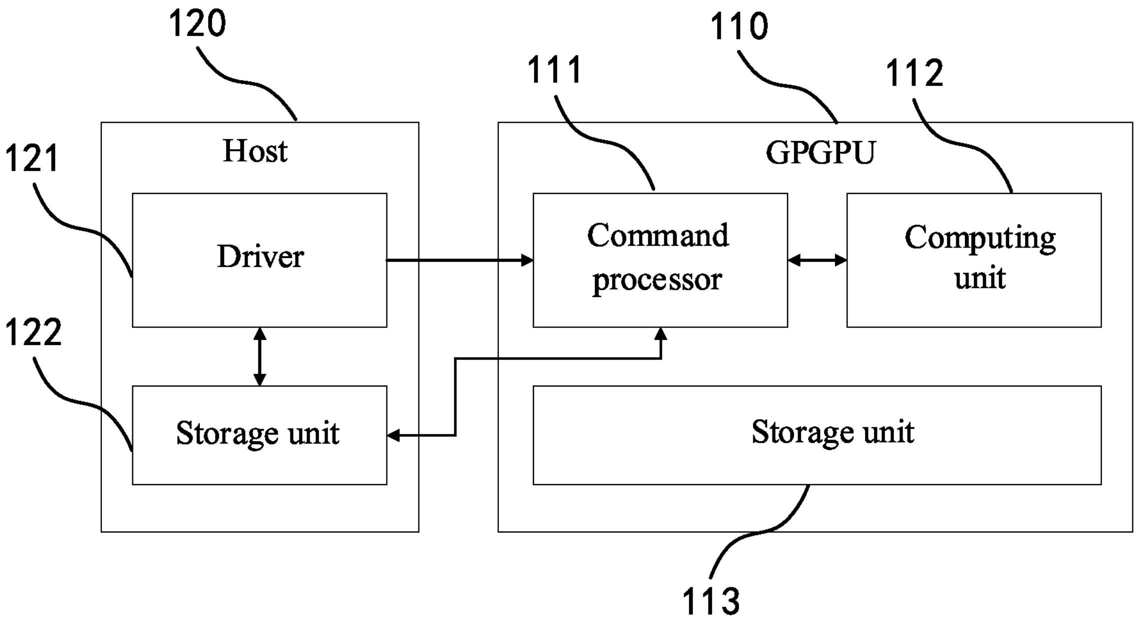
FIG. 1 shows a schematic diagram of interaction between a chip and a task initiator.

FIG. 1 shows a schematic diagram of interaction between a chip and a task initiator. As shown in FIG. 1, the chip is, for example, a GPGPU (General-purpose computing on graphics processing units) chip 110, and the task initiator refers to, for example, a host (primary control terminal) 120. The chip 110 includes a command processor 111 (or a task scheduler, etc.), one or more computing units 112, a storage unit 113, and the like. The command processor 111 is configured to parse command packets sent by the host 120 and to dispatch some specified workloads in the command packets to kernel modules (e.g., the computing units 112) of the chip. The host may be any hardware processor or hardware module including a CPU.

The host 120 includes a driver 121 and a storage unit 122. An application program may create a command queue (e.g., Ring buffer) via the driver 121 (or by the driver spontaneously) and be mapped in the command processor 111. After the driver 121 creates the command queue, command packets may be prepared in the storage unit 122 and the command processor 111 may be notified via a doorbell to execute tasks, and then the host 120 may wait for the task execution to finish. In some of the following embodiments, the command queue may also be referred to as a task queue or simply a queue.

Figure 2:
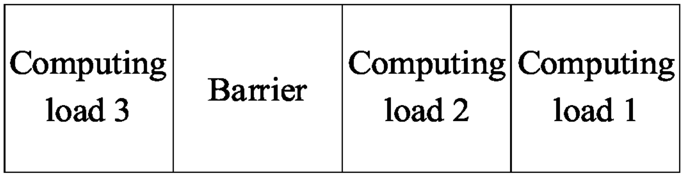
FIG. 2 shows a schematic diagram of a command queue.

FIG. 2 shows a schematic diagram of a command queue. As shown in FIG. 2, a command queue (or a task queue) includes a plurality of computing loads arranged sequentially in an execution order, such as a computing load 1, a computing load 2, and a computing load 3. In addition, a barrier (or a barrier command) may be included in the command queue. The barrier command is located between the computing loads, and the barrier command is a command for synchronization. When processing to the barrier command, check whether the computing loads before the barrier command in the command queue have all been executed, and in response to confirming that the computing loads before the barrier command have all been executed, the barrier command may be terminated and computing loads after the barrier command may be executed. The command processor 111 may parse and process the synchronization command in the command packet.

Figure 3:
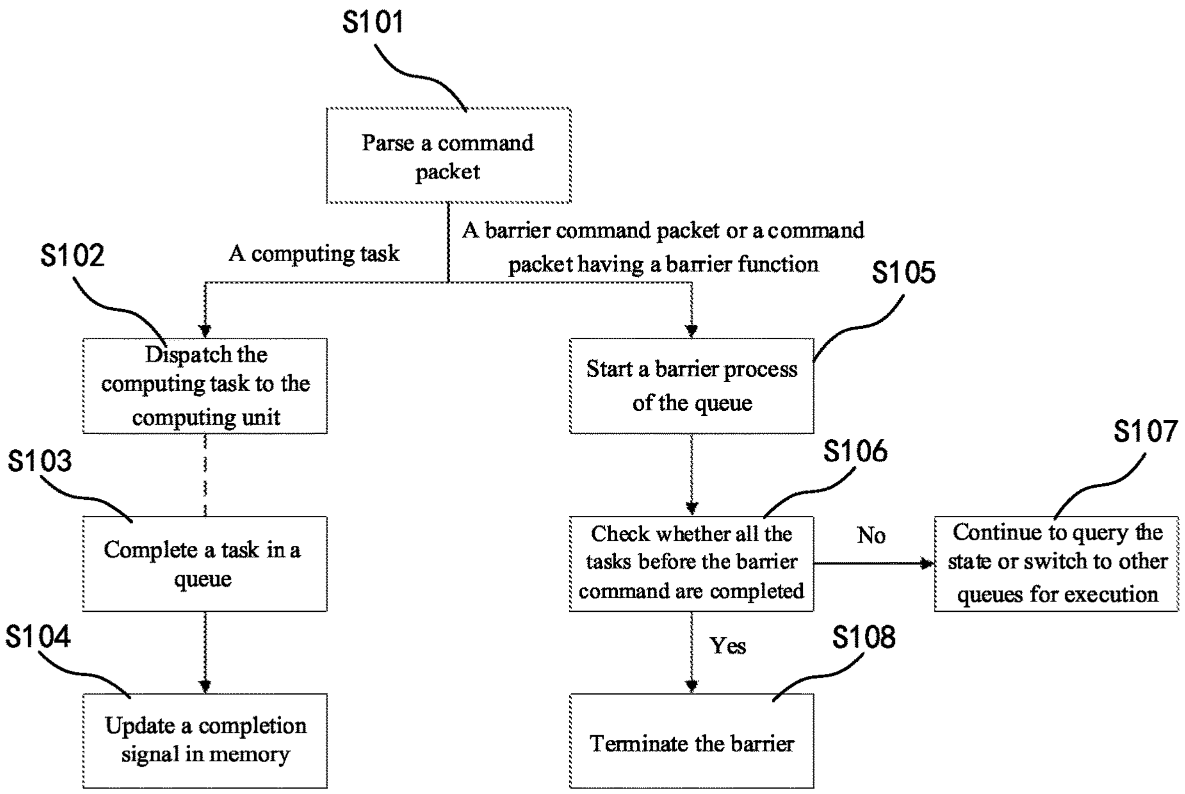
FIG. 3 shows a processing flowchart of a command processor.

FIG. 3 shows a processing flowchart of a command processor. As shown in FIGS. 1 and 3, after receiving a doorbell notification, the command processor 111 may fetch the command packet from the storage unit 122 and then parse the command packet (step S101); if the current command packet is a workload command packet that contains a computing task, the computing task is dispatched to the computing units 112 of the chip (step S102), and the command processor 111 may collect completion state of each computing unit 112; and when the command processor 111 confirms that a task (e.g., the computing load 1) of a queue has been completed (step S103), the command processor 111 may update a corresponding completion signal in memory (step S104). For example, when the command processor 111 confirms that some computing load is completed, it may write 0 (prior to which the driver sets it to a valid value of >0) to a memory area (the area for storing the completion signal), designated by the driver, in the storage unit 112. The driver 121 may determine whether some computing load is executed by accessing whether this memory area is 0 or not.

If the current command packet contains a synchronization command such as a barrier command (e.g., the current command packet is a barrier command packet or a command packet having a barrier function), the command processor 111 may start a barrier process for the queue (step S105), and the queue enters a barrier state. The command processor 111 checks whether all the tasks (computing loads) before the barrier command are completed (step S106). In response to confirming that all the tasks (e.g., the computing load 1 and the computing load 2) before the barrier command in the current queue are completed, the barrier command may be terminated (step S108), that is, the barrier state may be terminated, so as to execute a task (e.g., the computing load 3) after the barrier command. If the task before the barrier command in the current queue has not been completed, i.e., the queue is still in the barrier state, the command processor may continue to query the state or switch to other queues for execution (step S107), where continuing to query the state refers to continuing to query the processing state of all the tasks before the barrier command in the current queue. In step S107, while the command processor waits for the completion of the computing load in the current queue, if there are still commands pending in other command queues, the command processor may still process command packets in other command queues, such as processing and dispatching command packets in other queues, so as to improve processing efficiency. For example, the chip includes a plurality of computing units such as a computing unit A1 and a computing unit A2. The computing load 1 is sent to the computing unit A1 for execution, and the computing load 2 is sent to the computing unit A2 for execution. In the case where the computing unit A1 has finished executing the computing load 1 and the computing unit A2 has not finished executing the computing load 2, it is necessary to wait for the completion of the computing load 2. While waiting for the execution of the computing load 2, the command processor may send a computing load in another queue to the computing unit A1 to cause the computing unit A1 to process the computing load in the other queue. After all of the computing loads before the barrier command in the current command queue are completed, the barrier can be terminated (step S108).

As shown in FIGS. 1 and 2, the command processor 111 sends the computing load 1 and the computing load 2 successively to the computing units 112. With sufficient resources, the computing load 1 and the computing load 2 may be executed on the computing unit 112 simultaneously. When executing to the barrier command, the command processor 111 waits for the computing load 1 and the computing load 2 to finish execution on the computing unit 112, and then the barrier command can be terminated, followed by sending the computing load 3 to the computing unit 112.

The above solution refers to a task processing flow for a single chip. The inventor has found that in a multi-chip interconnected architecture, if a multi-chip module is utilized to process the above command queue, each computing load in the queue may be dispatched to multiple chips for processing, and each chip processes a part of a computing task of the computing load. For example, in the case where the multi-chip architecture includes four chips, the computing load 1 may be divided into four subloads, and each chip executes one of the subloads. However, in this case, if executing to a synchronization command, each chip can only implement its own synchronization, and synchronization between the multiple chips is not ensured.

At least one embodiment of the present disclosure provides a task processing method for a multi-chip module, a task processing method for a chip, a chip, a multi-chip module, an electronic device, and a computer-readable storage medium. The multi-chip module includes N chips. The task processing method for a multi-chip module includes: acquiring, by each of the N chips, respective subqueue information related to a current task queue, where the current task queue includes a plurality of tasks arranged in an execution order and a synchronization command located between the plurality of tasks, each of the plurality of tasks includes N subtasks, and the N subtasks are configured to be executed by the N chips respectively; sequentially executing, by each of the N chips, corresponding subtasks in the current task queue in accordance with the execution order based on the respective subqueue information; each of the N chips, in response to executing to the synchronization command, confirming whether the N chips have all finished executing corresponding subtasks before the synchronization command in the current task queue, and terminating the synchronization command to execute a corresponding subtask after the synchronization command in response to confirming that the N chips have all finished executing the corresponding subtasks before the synchronization command in the current task queue, in which N is an integer greater than 1.

According to the task processing method, the barrier command is terminated only after it is confirmed that each chip in the multi-chip module has finished executing the corresponding subtasks before the barrier command. In this way, synchronization between the multiple chips is achieved via the barrier command, forced synchronization is performed when the multiple chips execute to a certain point in the queue that requires synchronization, thereby effectively ensuring that each of the chips can execute correctly when there is a dependency on the previous and subsequent commands in the queue.

Figure 4:
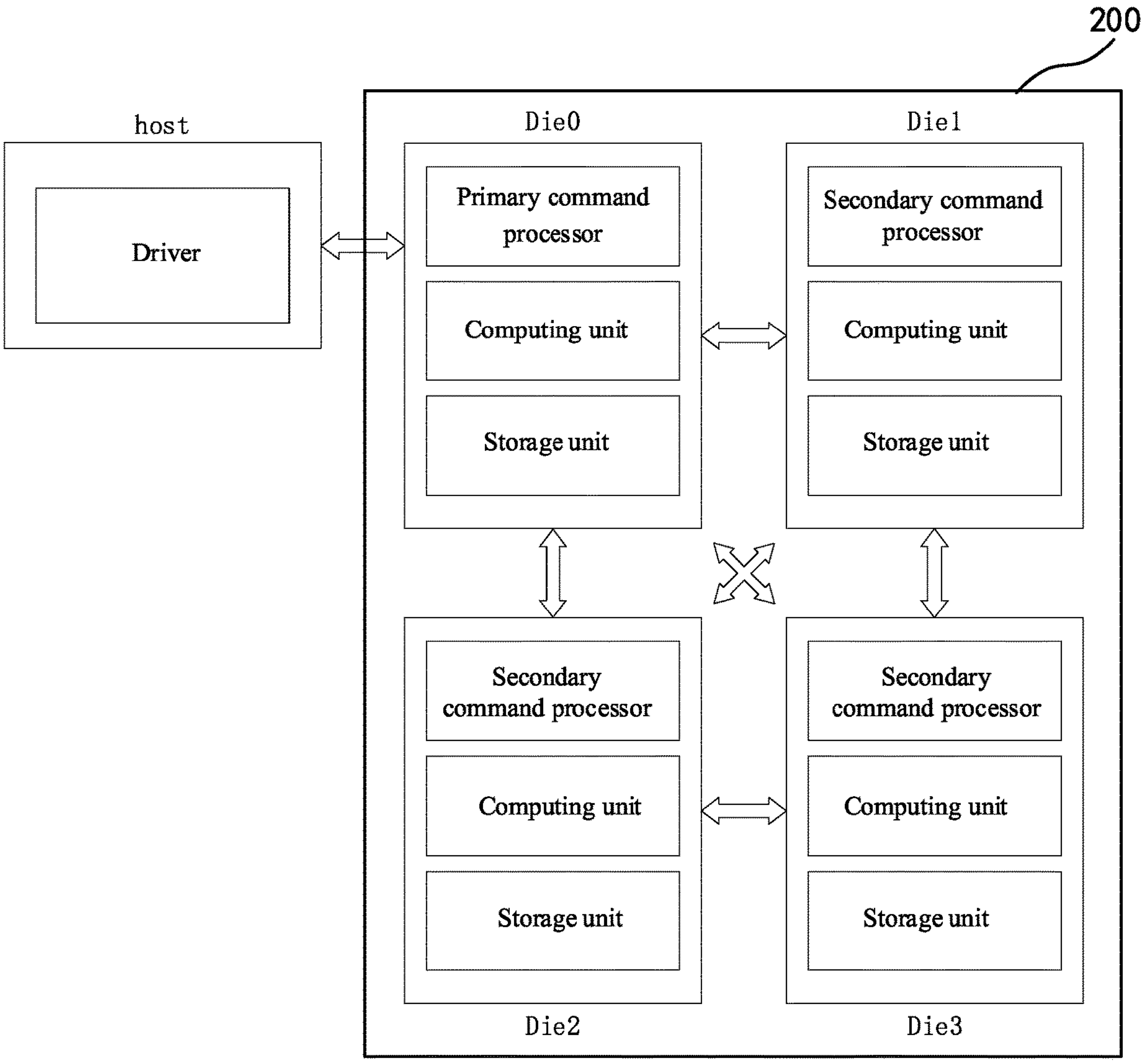
FIG. 4 shows a schematic diagram of a multi-chip module according to at least one embodiment of the present disclosure.

FIG. 4 shows a schematic diagram of a multi-chip module according to at least one embodiment of the present disclosure. As shown in FIG. 4, the multi-chip module 200 includes interconnected N chips (N being an integer greater than 1), for example, including multiple interconnected Dies: Die 0, Die 1, Die 2, and Die 3, and so on, each of the Dies may be regarded as a chip. The number of Dies may also vary depending on the actual situation, and in other embodiments, for example, two or more than four Dies or the like may be included.

For example, in some embodiments, the N chips included in the multi-die module may be of the same type, such as all being GPU chips or DSA chips. In other embodiments, the N chips included in the multi-chip module may be various chips in different types, for example, the multi-chip module may be a hybrid multi-chip module consisting of a DSA chip, a GPU chip, a GPGPU chip, and the like.

For example, each Die may include modules such as a command processor, a computing unit, a storage unit, and the like. There is a high-speed interconnection channel between the Dies. The multiple Dies may include a primary Die and a plurality of secondary Dies, for example, Die 0 is the primary Die, and Die 1 to Die 3 are all secondary Dies. Each chip in the multi-chip module 200 may interact with the host, for example, the primary Die may directly interact with the host, and each secondary Die may interact with the host via the primary Die. A command processor in the primary Die may be defined as a primary command processor, a command processor in a secondary Die may be defined as a secondary command processor, and an interconnection channel may exist between the primary command processor and each secondary command processor. The primary Die may be responsible for dispatching tasks, synchronizing with the host, and the like, and each secondary Die may share the computing loads with the primary Die. The tasks dispatched by the host may be assigned to the computing unit of each Die in some form.

Figure 5:
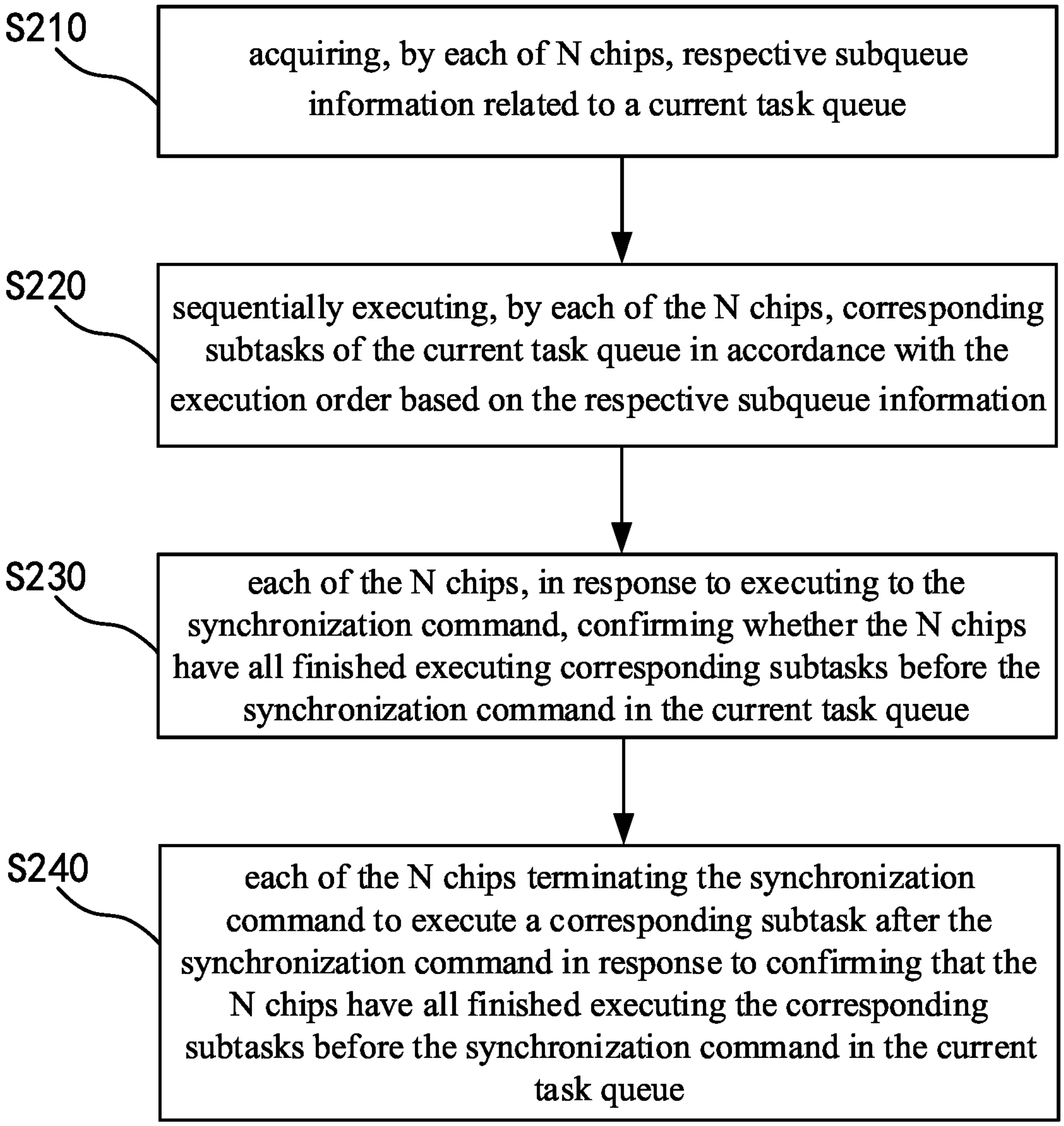
FIG. 5 shows a flowchart of a task processing method for a multi-chip module according to at least one embodiment of the present disclosure.

FIG. 5 shows a flowchart of a task processing method for a multi-chip module according to at least one embodiment of the present disclosure.

As shown in FIG. 5, the task processing method may include steps S210 to S240.

Step S210: acquiring, by each of N chips, respective subqueue information related to a current task queue. The current task queue includes a plurality of tasks arranged in an execution order and a synchronization command between the plurality of tasks, each of the plurality of tasks includes N subtasks, and the N subtasks are configured to be executed by the N chips respectively;

Step S220: sequentially executing, by each of the N chips, corresponding subtasks of the current task queue in accordance with the execution order based on the respective subqueue information.

Step S230: each of the N chips, in response to executing to the synchronization command, confirming whether the N chips have all finished executing corresponding subtasks before the synchronization command in the current task queue.

Step S240: each of the N chips terminating the synchronization command to execute a corresponding subtask after the synchronization command in response to confirming that the N chips have all finished executing the corresponding subtasks before the synchronization command in the current task queue.

For example, in step S210, the tasks may include a computing task (or computing load), an image processing task, a graphics pipeline task, and the like. In some of the following embodiments, taking the plurality of tasks as a plurality of computing loads as an example to illustrate. For example, the current task queue includes a computing load 1, a computing load 2, and a computing load 3 sequentially arranged in an execution order. The synchronization command may include a barrier command. For example, there is a barrier command between the computing load 2 and the computing load 3, in which case the current task queue includes the computing load 1, the computing load 2, the barrier command, and the computing load 3 in sequential order. It is to be noted that the barrier command may be a barrier command packet or a command packet performing a barrier or synchronization function.

For example, the task processing method may be used in a multi-chip module 200 shown in FIG. 4. The multi-chip module 200 includes at least N chips, and in the case of N=4, for example, the multi-chip module 200 may include Die 0, Die 1, Die 2, and Die 3, and each of the Die 0, Die 1, Die 2, and Die 3 may be used as a chip. Correspondingly, each computing load in the current command queue may include at least four subloads (or subtasks), and the four subloads are executed by the four Dies, respectively.

It is to be noted that the embodiment of the present disclosure is illustrated by the example of N chips used to execute the N subtasks respectively, but is not used to limit the multi-chip module to include only those N chips, and in some embodiments, the multi-chip module may include other chips in addition to those N chips. In practical applications, other chips in addition to the N chips may also receive the task packet in the current task queue. However, because this part of chips is not used to execute the task packet, this part of chips may directly enter a processing completion flow after receiving the task packet. Each chip in the multi-chip module may determine whether it needs to execute the task packet by judging conditions.

Figure 6:
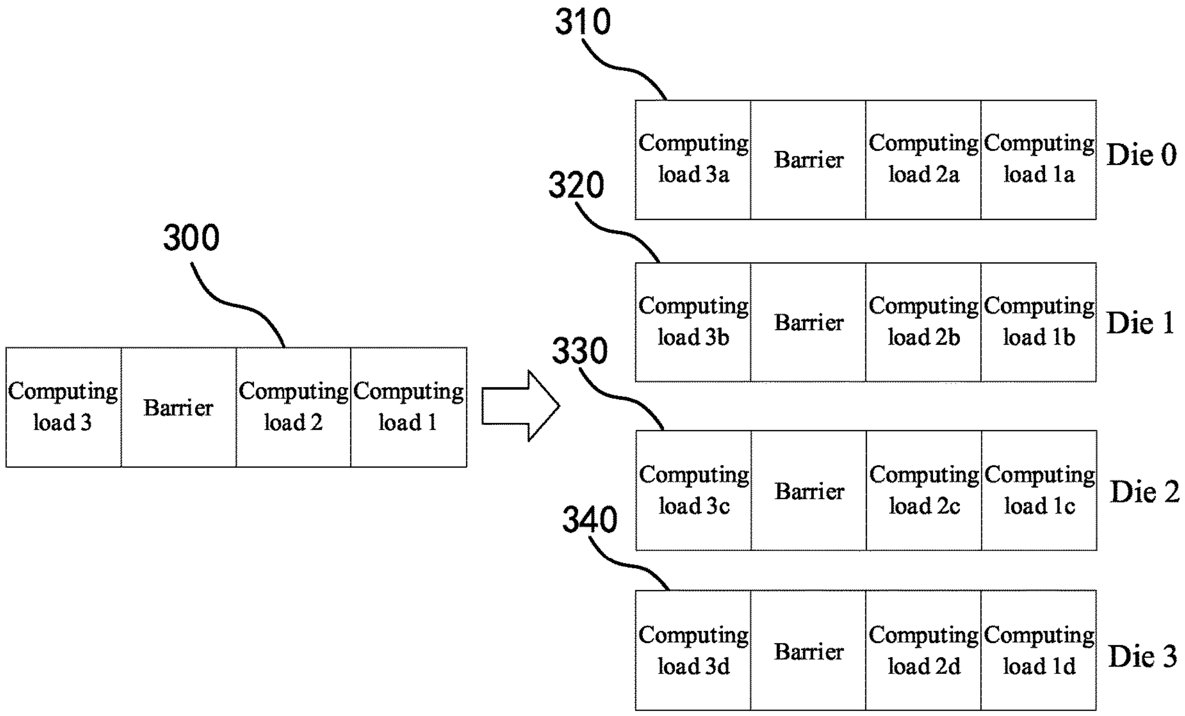
FIG. 6 shows a schematic diagram of a current task queue according to at least one embodiment of the present disclosure.

FIG. 6 shows a schematic diagram of a current task queue according to at least one embodiment of the present disclosure. As shown in FIG. 6, the computing load 1 may be divided into a computing load 1*a*, a computing load 1*b*, a computing load 1*c*, and a computing load 1*d*. The computing loads 1*a* to 1*d* are all subloads of the computing load 1 and are executed by Die 0 to Die 3, respectively. Similarly, the other computing loads each may also include four subloads.

For example, the subqueue information corresponding to each chip includes information about a subtask in the current task queue that the chip needs to execute. In addition, the subqueue information may include information about a barrier command located between the subtasks. In the subqueue information, an arrangement order of the subtasks and the barrier command is the same as an arrangement order of the tasks and the barrier command in the current task queue. It is to be understood that the current task queue is divided into a plurality of subqueues, each chip executes one of the subqueues, and the subqueue information corresponding to each chip includes information of a subqueue that the chip needs to execute. For example, subqueue information 310 corresponding to Die 0 includes information about the computing load 1*a*, the computing load 2*a*, the barrier command, and the computing load 3*a* that Die 0 needs to execute. Similarly, subqueue information 320 to 340 includes information about subtasks that Die 1 to Die 3 need to execute, respectively.

For example, in some embodiments, each chip may acquire a complete computing load command packet in the current task queue 300, for example, the primary chip may acquire it from the storage unit of the host, and the secondary chip may acquire it from the storage unit of the host via the primary chip. It is to be understood that each chip has a complete current task queue 300. During execution, each chip may execute only part of each computing load. For example, for the computing load 1, Die 0 to Die 3 may all acquire the command packet of the computing load 1. During execution, Die 0 may execute the part of computing load 1*a* of the computing load 1 based on its corresponding subqueue information, Die 1 may execute the part of computing load 1*b* based on its corresponding subqueue information, Die 2 may execute the part of computing load 1*c* based on its corresponding subqueue information, and Die 3 may execute the part of computing load 1*d* based on its corresponding subqueue information. For example, in some other embodiments, each chip may also acquire only its respective corresponding subload command packet.

For example, in step S220, Die 0 may sequentially execute the computing load 1*a*, the computing load 2*a*, and the like in order according to its corresponding subqueue information. When processing to the barrier command, Die 0 enters a barrier state. In the barrier state, Die 0 needs to confirm whether itself and the other Dies (Die 1 to Die 3) have finished executing corresponding subtasks before the barrier command, for example, confirm whether Die 0 itself has finished executing the computing load 1*a* and the computing load 2*a*, whether Die 1 has finished executing the computing load 1*b* and the computing load 2*b*, whether Die 2 has finished executing the computing load 1*c* and the computing load 2*c*, and whether Die 3 has finished executing the computing load 1*d* and the computing load 2*d*. If Die 0 confirms that both itself and the other Dies have finished executing the corresponding subtasks before the barrier command, Die 0 may terminate the barrier task (i.e., terminate the barrier state) and start to execute the computing load 3*a*. Similarly, each of Die 1, Die 2, and Die 3, when processing to the barrier task, also needs to confirm whether itself and the other Dies have finished executing the corresponding subtasks before the barrier command, and terminate the barrier command to execute a subsequent subtask after confirming that they have all finished the execution.

In the task processing method according to the embodiment of the present disclosure, the barrier command is terminated only when it is confirmed that each chip in the multi-chip module has finished executing the corresponding subtasks before the barrier command. In this way, synchronization between the multiple chips is achieved via the barrier command, forced synchronization is performed when the multiple chips are executed to a certain point in the queue that requires synchronization, thus effectively ensuring that each chip can execute correctly when there is a dependency on the previous and subsequent commands in the queue.

For example, N chips include a primary chip and at least one secondary chip. As shown in FIG. 4, Die 0 is a primary Die and Die 1 to Die 3 are all secondary Dies. For example, a register for representing the primary-secondary information may be added to each Die, and value of the register may allow hardware to confirm whether the die is a primary Die or a secondary Die. In addition, in other embodiments, other means may also be used to distinguish between primary and secondary.

For example, step S230 includes: for each of the at least one secondary chip, confirming, in response to executing to the synchronization command, whether the secondary chip itself has finished executing corresponding subtasks before the synchronization command; in response to confirming that the secondary chip itself has finished executing corresponding subtasks before the synchronization command, sending a first synchronization signal to the primary chip; and terminating the synchronization command in response to receiving a second synchronizing signal sent by the primary chip; where the second synchronization signal indicates that the primary chip has received the first synchronization signal sent by all of the at least one secondary chip related to the primary chip.

For example, step S230 includes: for the primary chip, confirming, in response to executing to the synchronization command, whether the primary chip itself has finished executing corresponding subtasks before the synchronization command; in response to confirming that the primary chip has finished executing corresponding subtasks before the synchronization command, checking whether the first synchronization signal sent by all of the at least one chip has been received; and sending the second synchronization signal to each of the at least one secondary chip and terminating the synchronization command in a case where the first synchronization signal sent by all of the at least one secondary chip has been received.

For example, as shown in FIG. 6, when Die 1 processes to the barrier command, the command processor of Die 1 may first confirm whether both the computing load 1*b* and the computing load 2*b* are completed. If the computing load 1*b* and/or the computing load 2*b* have not been completed, the command processor waits for the completion of the computing load 1*b* and the computing load 2*b*. In this process, the command processor may continuously query the processing state and may also switch to execute tasks in other queues. After querying that both the computing load 1*b* and computing load 2*b* are completed, the first synchronization signal may be sent to Die 0 by Die 1. Similarly, Die 2 and Die 3 may send the first synchronization signal to Die 0 after confirming that they have each finished executing their corresponding subtasks before the barrier command.

For example, Die 0, after receiving the first synchronization signal sent by the respective secondary Die, may record the secondary Die that sends the first synchronization signal. The Die 0 may, when processing to the barrier command, first confirm whether both the computing load 1*a* and the computing load 2*a* are completed; if the computing load 1*a* and/or the computing load 2*a* have not been completed, the command processor of Die 0 waits for the completion of the computing load 1*a* and the computing load 2*a*. In this process, the command processor may continuously query the processing state and may also switch to execute tasks in other queues. After querying that both the computing load 1*a* and the computing load 2*a* are completed, the command processor of Die 0 may further query whether each of the secondary Dies has sent the first synchronization signal. If the first synchronization signal of at least part of the secondary Dies has not been received, the command processor of Die 0 waits. During the waiting process, the command processor of Die 0 may continuously query whether the first synchronization signal of the at least part of the secondary Dies has been received. After querying that the first synchronization signals of all of the secondary Dies have been received, it may be confirmed that each Die has finished executing the subtasks for which it was responsible before the barrier command, so that the primary Die may send the second synchronization signal to each secondary Die to inform the respective secondary Die that synchronization has been completed, and accordingly, the barrier command may be terminated to continue the following execution.

According to the above interactive operation, the primary chip and the secondary chips first confirm whether they have finished executing the corresponding subtasks in the barrier state, and then the task completion state is collected to the primary chip. When the primary chip confirms that all the chips have finished executing, the primary chip notifies each secondary chip to terminate the barrier state. Based on this approach, the processing state of each chip can be collected quickly, making the synchronization operation more efficient.

For example, each secondary chip may have a secondary synchronization register related to the current task queue, the secondary synchronization register includes a bit corresponding to the secondary chip (i.e., the secondary chip to which the secondary synchronization register belongs) and a bit corresponding to the primary chip, and the bit corresponding to the secondary chip and the bit corresponding to the primary chip both have an initial value. For each of the secondary chips, in response to confirming that the secondary chip itself has finished executing corresponding subtasks before the synchronization command, the bit, corresponding to the secondary chip, in the secondary synchronization register is changed from the initial value to a target value, and the first synchronization signal is sent to the primary chip by the secondary chip. In response to receiving the second synchronization signal sent by the primary chip, the bit, corresponding to the primary chip, in the secondary synchronization register is changed from the initial value to the target value. Value of the secondary synchronization register is queried, and the synchronization command is terminated in a case where the bit corresponding to the secondary chip and the bit corresponding to the primary chip in the secondary synchronization register are both the target value.

For example, the secondary synchronization register may include bits corresponding to other secondary chips in addition to the bits respectively corresponding to the current secondary chip and the primary chip.

Figure 7:
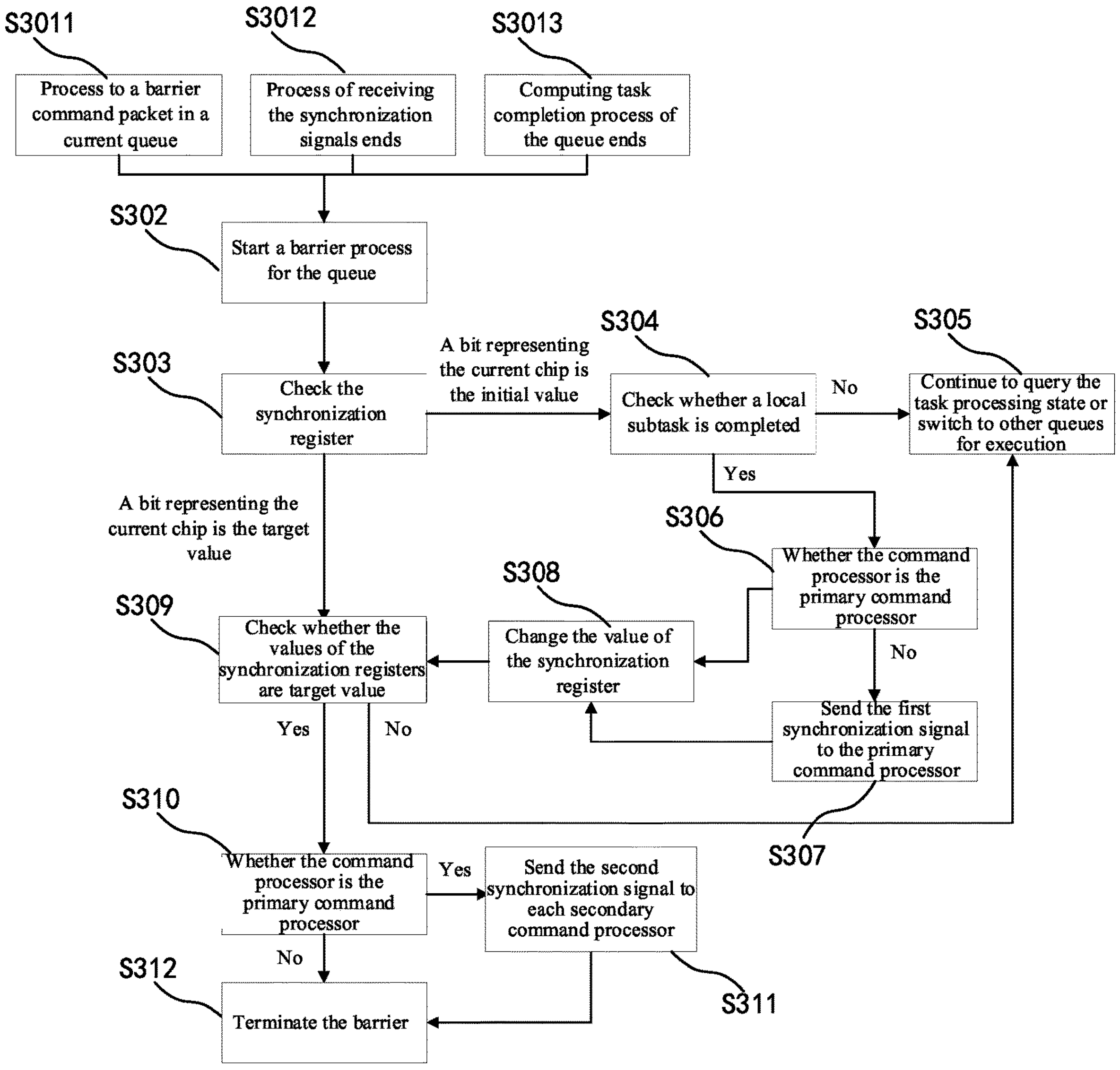
FIG. 7 shows a schematic diagram of a processing flow of a command processor according to at least one embodiment of the present disclosure.

FIG. 7 shows a schematic diagram of a processing flow of a command processor according to at least one embodiment of the present disclosure.

As shown in FIG. 7, in the case of a secondary chip Die 1, for example, when processing to a barrier command packet in a current queue (step S3011), the secondary chip Die 1 starts a barrier process for the queue (step S302), enters a barrier state, and checks value of the synchronization register (secondary synchronization register of Die 1) (step S303). The bit width of the secondary synchronization register is, for example, the same as the number of Dies included in the multi-chip module, and each bit of the secondary synchronization register indicates, for example, the state of one Die. The number of Dies is, for example, four. Correspondingly, the secondary synchronization register includes, for example, four bits, and the first bit to the fourth bit, for example, sequentially indicate the states of Die 0, Die 1, Die 2, and Die 3. The initial value of the secondary synchronization register of Die 1 is, for example, 0011, that is, the initial value of the bit in the secondary synchronization register that represents the current secondary Die and the primary Die may be set to 0, and the initial value of the bit that represents the other secondary Dies may be set to 1. If the bit representing Die 1 in the secondary synchronization register of Die 1 is the initial value according to the querying, check whether a local subtask is completed (step S304), i.e., check whether Die 1 itself has finished executing the subtasks that is corresponding to Die 1 and that is before the barrier command (the computing loads 1*b* and 2*b*). If the subtasks have not been finished, continue to query the task processing state or switch to other queues for execution (S305). If the subtasks have been finished, confirm whether the command processor of Die 1 is the primary command processor (step S306). Because the command processor of Die 1 is not the primary command processor, Die 1 sends the first synchronization signal to the primary command processor (step S307) and change the value of the bit, corresponding to Die 1, in the secondary synchronization register (step S308), and accordingly, the bit, corresponding to Die 1, in the secondary synchronization register, is changed to a target value, for example, the value of the secondary synchronization register is changed from 0011 to 0111. When Die 1 receives the second synchronization signal sent by Die 0, the bit, corresponding to Die 0, in the secondary synchronization register is changed from the initial value to the target value, for example, the value of the secondary synchronization register is changed to 1111. After Die 1 performs step S308 and before receiving the second synchronization signal, the bit in the secondary synchronization register that represents the current secondary chip Die 1 is the target value and the bit representing the primary chip Die 0 is the initial value. During this period, it is possible to continuously check whether the values of the synchronization registers are all changed to the target value (step S309). If the values of the synchronization registers are not all target values, continue to query the states of the synchronization registers or switch to other queues for execution (S305). If the values of the synchronization registers are all target values, confirm again whether the command processor is the primary command processor (step S310). Because the command processor of Die 1 is not the primary command processor, the barrier may be terminated (step S312). In addition, the synchronization process of steps S302 to S312 may also be started after each end of the process of receiving the synchronization signals (step S3012), for example, after receiving the second synchronization signal sent by Die 0, Die 1 may start the synchronization process of steps S302 to S312. In the barrier state, the synchronization process of steps S302 to S312 may also be started if the task completion process of the queue ends (step S3013). For example, after Die 1 has finished executing the corresponding subtasks before the barrier command, the synchronization process of steps S302 to S312 may be started several times during the waiting period to check in real time whether the barrier command can be ended.

For example, in some other embodiments, the initial value of the secondary synchronization register of Die 1 is, for example, 0000, that is, the initial values of the bits in the secondary synchronization register that represent the current secondary Die and the other Dies may all be set to 0, which may be changed to 0100 after confirming that Die 1 itself has finished executing the corresponding subtasks before the barrier command, and may be changed to 1111 after receiving the second synchronization signal from Die 0.

For example, the processing flow of the command processors of the other secondary chips Die 2 and Die 3 may refer to the processing flow of the command processor of Die 1 described above, and will not be repeated herein.

For example, the above embodiments describe a situation in which a secondary Die first confirms that it has finished executing the corresponding subtasks before receiving the second synchronization signal. In some embodiments, it may also be the case that a secondary Die first receives the second synchronization signal before confirming whether the secondary Die has finished executing the corresponding subtasks due to the high execution speed of the primary Die and other secondary Dies. For the latter case, for each of the secondary chips, in response to receiving the second synchronization signal sent by the primary chip, the bits, corresponding to the primary chip and the other secondary chips, in the secondary synchronization register are all changed to the target value; in response to confirming that the current secondary chip has finished executing the corresponding subtasks before the synchronization command, the bit, corresponding to the current secondary chip, in the secondary synchronization register is changed from the initial value to the target value. Taking Die 1 as an example, the initial value of the secondary synchronization register of Die 1 is, for example, 0011, if Die 1 receives the second synchronization signal sent by the primary Die before Die 1 confirms whether it has finished executing the corresponding subtasks, in such a case, the value of the secondary synchronization register of Die 1 may be changed to 1011, and after Die 1 confirms that it has finished executing the corresponding subtask, the value of the secondary synchronization register of Die 1 is changed to 1111.

For example, the primary chip may have a primary synchronization register related to the current task queue, the primary synchronization register includes N bits corresponding to the N chips respectively, and the N bits each have an initial value; For the primary chip, in response to confirming that the primary chip has finished executing corresponding subtasks before the synchronization command, a bit, corresponding to the primary chip, in the primary synchronization register is changed from the initial value to a target value. A bit, corresponding to a secondary chip, in the primary synchronization register is changed from the initial value to a target value after receiving the first synchronization signal sent by the secondary chip. The N bits of the primary synchronization register are all changed to the target value after receiving the first synchronization signal sent by all of the at least one secondary chip. Value of the primary synchronization register is queried and, in the case where all the N bits of the primary synchronization register are the target value, it is confirmed that the first synchronization signal sent by all of the at least one secondary chip has been received.

As shown in FIG. 7, in the case of a primary chip Die 0, for example, when processing to a barrier command packet in a current queue (step S3011), Die 0 starts a barrier process for the queue (step S302), enters a barrier state, and checks value of the synchronization register (a primary synchronization register of Die 0) (step S303). The bit width of the primary synchronization register is, for example, the same as the number of Dies included in the multi-chip module, and each bit of the primary synchronization register indicates, for example, the state of one Die. The number of Dies is, for example, four. The primary synchronization register includes, for example, four bits, and the first bit to the fourth bit, for example, sequentially indicate the states of Die 0, Die 1, Die 2, and Die 3. The initial value of the primary synchronization register for Die 0 is, for example, 0000, which means that the initial value of each bit in the primary synchronization register may be set to 0. If the bit representing Die 0 in the primary synchronization register of Die 0 is the initial value according to the querying, check whether the local subtasks are completed (step S304), i.e., check whether Die 0 itself has finished executing the corresponding subtasks (the computing loads 1*a* and 2*a*) before the barrier command. If the corresponding subtasks before the barrier command have not been completed, continue to query the state or switch to other queues for execution (S305). If the corresponding subtasks before the barrier command have been completed, confirm whether the command processor of Die 0 is the primary command processor (step S306). Because the command processor of Die 0 is the primary command processor, the value of the synchronization register may be changed (step S308), and accordingly, the bit, corresponding to Die 0, in the primary synchronization register of Die 0 is changed to the target value, for example, the primary synchronization register is changed from 0000 to 1000. When Die 0 receives the first synchronization signal sent from a secondary Die each time, the bit, corresponding to that secondary Die, in the primary synchronization register is changed to a target value (e.g., 1). For example, after Die 0 receives the first synchronization signal from Die 1, the value of the primary synchronization register may be changed to 1100. On the basis of 1100, if Die 0 receives the first synchronization signal from Die 2, the value of the primary synchronization register may be changed to 1110. On the basis of 1110, if Die 0 receives the first synchronization signal from Die 3, the value of the primary synchronization register may be changed to 1111. After Die 0 performs step S308 and before the initial values of the registers are all changed to the target values, Die 0 may check whether the values of the synchronization registers are all changed to the target values (step S309). If the values of the synchronization registers are not all the target values, it means that at least part of the secondary dies have unfinished subtasks, Die 0 may continue to query the states of the synchronization registers or to switch to other queues for execution (step S305). If the values of the synchronization registers are all the target values, Die 0 may confirm again whether its command processor is the primary command processor (step S310). Because the command processor of Die 0 is the primary command processor, Die 0 sends the second synchronization signal to each secondary command processor (step S311) and terminate the barrier (step S312).

For example, the primary chip has no restriction on the order in which it receives the first synchronization signals sent by the secondary chips, and each secondary chip may send the first synchronization signal to the primary chip after confirming the completion of its corresponding subtasks before the barrier command. For each first synchronization signal received by the primary chip from a secondary Die, a bit, corresponding to that secondary Die, in the primary synchronization register is changed to 1.

For example, the above embodiments describe a situation in which the primary Die first confirms that it has finished executing the corresponding subtasks before receiving the first synchronization signal sent by each secondary Die. In some embodiments, it may also be the case that the primary Die receives the first synchronization signal sent by at least part of the secondary Dies before confirming that it has finished executing the corresponding subtasks due to the high execution speed of the respective secondary Die. For this case, after receiving the first synchronization signal from each secondary Die, the bit, corresponding to the secondary Die, in the primary synchronization register of the primary Die is changed (e.g., changed to 1). After the primary Die confirms that it has finished executing the corresponding subtasks, the bit, corresponding to the primary Die, in the primary synchronization register is then changed (e.g., changed to 1). Taking Die 0 as an example, the initial value of the primary synchronization register of Die 0 is, for example, 0000. If Die 0 receives the first synchronization signal from Die 1 before confirming whether it has finished executing the corresponding subtasks, in this case, the value of the primary synchronization register of Die 0 may be changed to 0100, and after receiving the first synchronization signal from Die 2, the value may be changed to 0110. After Die 0 confirms that it has finished executing the corresponding subtasks, the value of the primary synchronization register is changed to 1110, and after receiving the first synchronization signal from Die 3, the value of the primary synchronization register is changed to 1111.

For example, for the primary chip and each secondary chip, the bits of the synchronization register may be reset to their initial values after the barrier is terminated.

Based on the above operations on the synchronization registers, each chip may use the values of the synchronization register to represent the current synchronization state, which is easy to implement and highly accurate.

Figure 8:
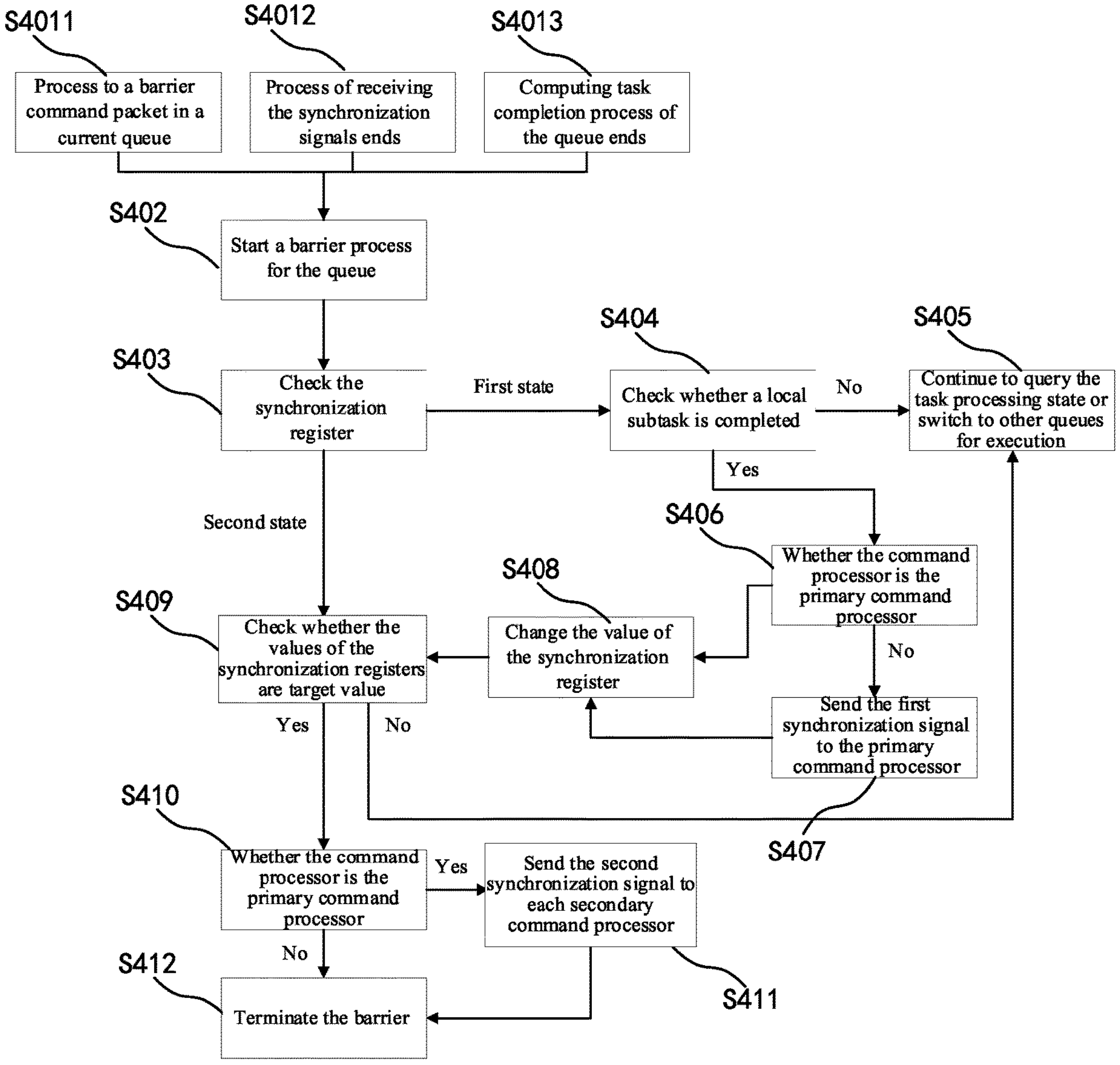
FIG. 8 shows a schematic diagram of a processing flow of another command processor according to at least one embodiment of the present disclosure.

FIG. 8 shows a schematic diagram of a processing flow of another command processor according to at least one embodiment of the present disclosure.

As shown in FIG. 8, different from the processing flow shown in FIG. 7, the synchronization state (parameter) is utilized to represent the synchronization progress of each chip. For example, in the case where each chip has not yet confirmed that it has finished executing the corresponding subtasks before the barrier command, the synchronization state is a first state; in the case where it has confirmed that a chip has finished executing the subtasks before the barrier command, the synchronization state is a second state. Taking Die 1 as an example, in step S403, the synchronization state is checked, and if the synchronization state is the first state, steps S404 to S407 are performed, and then, the synchronization state is changed to the second state. In this case, the initial value of the secondary synchronization register of Die 1 is, for example, 0111, and then changed to 1111 after the second synchronization signal is received. Taking Die 0 as an example, in step S403, the synchronization state is checked (S403), and if the synchronization state is the first state, steps S404 to S407 are performed, and then, the synchronization state is changed to the second state. In this case, the initial value of the primary synchronization register of Die 0 is, for example, 1000, and after receiving the first synchronization signal sent from a secondary Die, a bit, corresponding to that secondary Die, in the primary synchronization register is changed to 1. If the values of the primary synchronization register are not all 1 when the primary command processor of Die 0 checks the primary synchronization register, it means that at least part of the Dies have not yet changed to the second state, that is, there are unfinished subtasks in the current queue. Until the bits of the primary synchronization register all become 1, it means that all Dies have changed to the second state, the second synchronization signal is sent to each secondary command processor, and Die 0 to Die 3 together terminate the barrier command. The other steps in FIG. 8 may refer to the corresponding steps in FIG. 7 and will not be repeated here.

For example, the N chips described above may be the same or similar chips, and the N chips may have different functions. Each of the N chips includes a command processor or a similar module to perform the synchronization work described above. For example, one of the N chips is a CPU and the other chip is a GPU. The CPU corresponds to subqueue information such as C1-C2-sync-C3, where C1, C2, and C3 each denote a subtask and sync denotes a synchronization command. The GPU corresponds to subqueue information such as G1-G2-sync-G3, where G1, G2 and G3 each denote a subtask and sync denotes a synchronization command. The task processing method of the embodiments of the present disclosure may ensure that C1, C2 in the CPU and G1, G2 in the GPU are completed before causing the CPU and GPU to execute C3 and G3, respectively.

For example, the N chips are configured to communicate with the task initiator, for example, Die 0 to Die 3 communicate with the host. For example, in some embodiments, the task processing method further includes: each of the N chips, after completing a corresponding subtask of each task in the current task queue, sending a completion message to the task initiator to cause the task initiator to confirm whether each task is completed. In this way, the task completion state is notified to the task initiator every time a task is completed, and accordingly synchronization between each chip and the task initiator may be achieved.

For example, the current task queue includes a first task, and the task initiator initializes task state of the first task as a value. After completing a corresponding subtask of the first task, each chip performs a computing operation on the task state to change the value of the task state until, after all of the N chips have performed the computing operation, the task state is changed to a completion value, to cause the task initiator to confirm whether the first task is completed based on whether the task state is the completion value.

Figure 9:
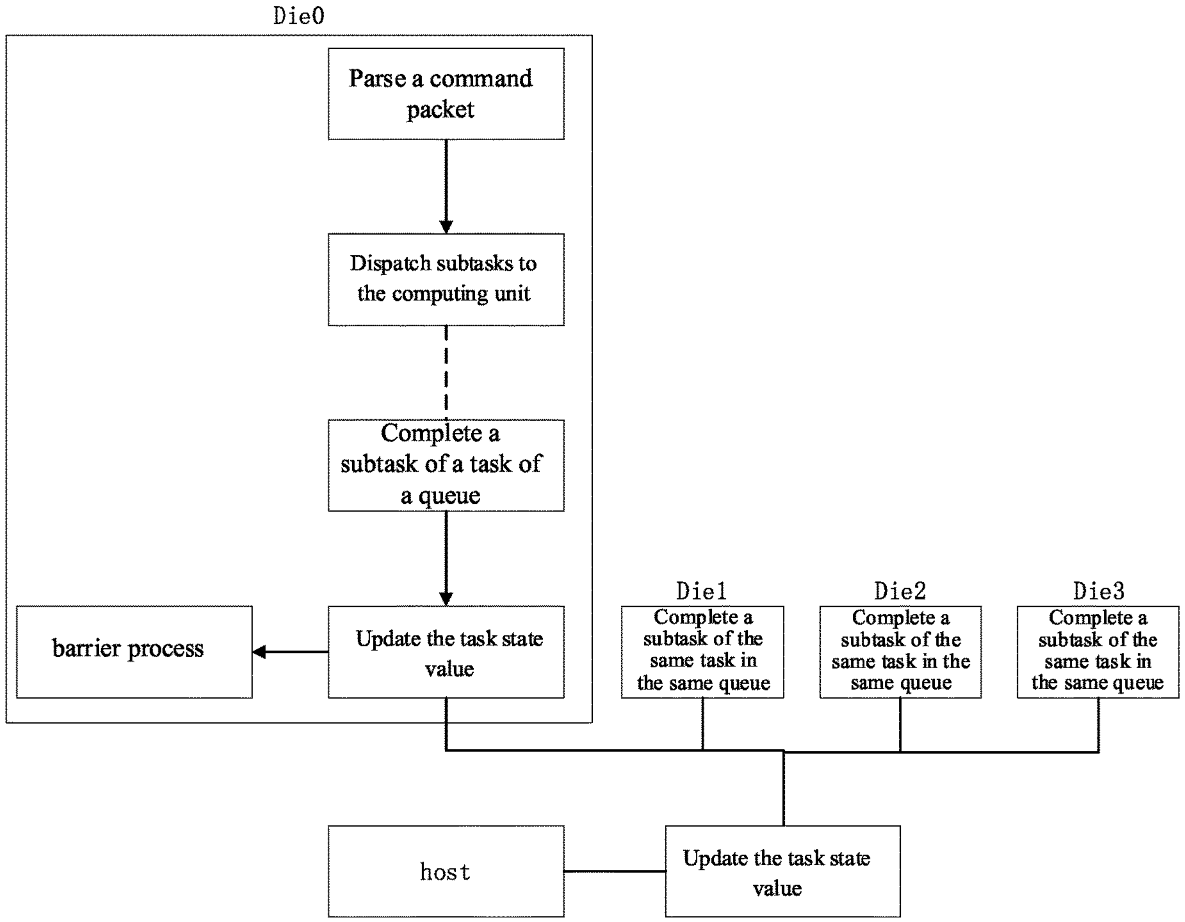
FIG. 9 shows a schematic diagram of a processing flow of another command processor according to at least one embodiment of the present disclosure.

FIG. 9 shows a schematic diagram of a processing flow of another command processor according to at least one embodiment of the present disclosure. As shown in FIG. 9, taking Die 0 as an example, before the host sends a task to the primary command processor, the host may initialize task state of each task. The task state value (i.e. the value of task state) may be the same as the number of dies, for example, four. The task state value may be stored in a memory area specified by the host. The task state value serves as a completion signal for the task, and is used to indicate whether the corresponding task is completed. After receiving a command packet for a task, the primary command processor parses the command packet and dispatches a parsed subtask to the computing unit of Die 0. If the command processor detects that the computing unit has completed a subtask of a task of a queue, the task state value of the host is updated, for example, an atomic subtraction operation may be utilized to subtract one from the corresponding task state value. Similarly, after another Die completes the subtask of the same task in the same queue, the corresponding task state value is also updated, for example, the atomic subtraction operation may be utilized to subtract one from the corresponding task state value. The atomic operation is a hardware mechanism ensuring that the memory operation of a Die will not be interfered by other Dies. The host may confirm whether the task is completed in the multi-die system by determining whether the task state value is 0 (completion value). In any Die, when the task is finished, in the case where the queue is in the barrier state, the die enters a barrier process.

At least one embodiment of the present disclosure further provides a task processing method for a chip.

Figure 10:
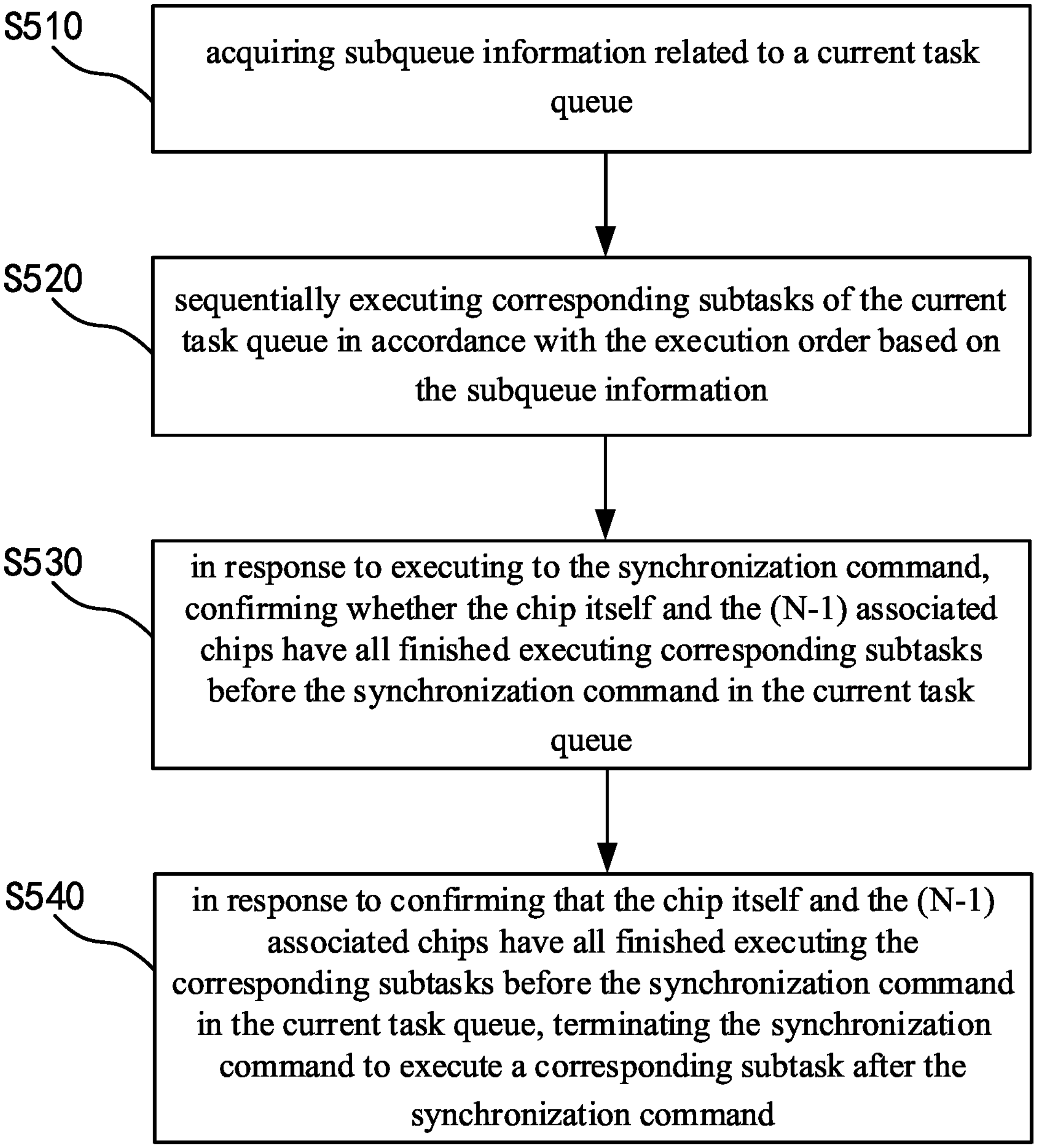
FIG. 10 shows a flowchart of a task processing method for a chip according to at least one embodiment of the present disclosure.

FIG. 10 shows a flowchart of a task processing method for a chip according to at least one embodiment of the present disclosure.

As shown in FIG. 10, the task processing method for a chip includes steps S510 to S540.

- Step S510: acquiring subqueue information related to a current task queue. The current task queue includes a plurality of tasks arranged in an execution order and a synchronization command between the plurality of tasks, each of the plurality of tasks includes N subtasks, and the N subtasks are configured to be executed by the chip and (N−1) associated chips respectively; where N is an integer greater than 1.
- Step S520: sequentially executing corresponding subtasks of the current task queue in accordance with the execution order based on the subqueue information.
- Step S530: in response to executing to the synchronization command, confirming whether the chip itself and the (N−1) associated chips have all finished executing corresponding subtasks before the synchronization command in the current task queue.
- Step S540: in response to confirming that the chip itself and the (N−1) associated chips have all finished executing the corresponding subtasks before the synchronization command in the current task queue, terminating the synchronization command to execute a corresponding subtask after the synchronization command.

For example, in the case where the (N−1) associated chips include a primary chip and the chip is a secondary chip related to the primary chip, step S530 may include: in response to executing to the synchronization command, confirming whether the chip itself has finished executing corresponding subtasks before the synchronization command; in response to confirming that the chip has finished executing corresponding subtasks before the synchronization command, sending a first synchronization signal to the primary chip. In a case where the chip has received a second synchronizing signal sent by the primary chip, it is confirmed that the chip itself and the (N−1) associated chips have all finished executing the corresponding subtasks before the synchronization command in the current task queue. The second synchronization signal indicates that the primary chip has received the first synchronization signal sent by all of the secondary chips related to the primary chip.

For example, in the case where the chip is a primary chip and each of the (N−1) associated chips is a secondary chip of the primary chip, step S530 may include: in response to executing to the synchronization command, confirming whether the chip itself has finished executing corresponding subtasks before the synchronization command; in response to confirming that the chip has finished executing corresponding subtasks before the synchronization command, checking whether the first synchronization signals sent by all of the (N−1) associated chips has been received. In a case where the primary chip has received the first synchronization signals sent by all of the (N−1) associated chips, it is indicated that the chip itself and the (N−1) associated chips have all finished executing the corresponding subtasks before the synchronization command in the current task queue, then the primary chip may send the second synchronization signal to each of the (N−1) associated secondary chips, and terminate the synchronization command.

For example, in the case where the (N−1) associated chips includes a primary chip and the chip is a secondary chip related to the primary chip, step S530 may include: in response to confirming that the secondary chip has finished executing corresponding subtasks before the synchronization command, changing a bit, corresponding to the secondary chip, in the secondary synchronization register from the initial value to a target value, and sending the first synchronization signal to the primary chip; in response to receiving the second synchronization signal sent by the primary chip, changing a bit, corresponding to the primary chip, in the secondary synchronization register from the initial value to the target value; and querying values of the secondary synchronization register, and in a case where the bit corresponding to the secondary chip and the bit corresponding to the primary chip in the secondary synchronization register are both the target value, confirming that the chip itself and the (N−1) associated chips all have finished executing the corresponding subtasks before the synchronization command in the current task queue.

For example, in the case where the chip is a primary chip and each of the (N−1) associated chips is a secondary chip of the primary chip, step S530 may include: in response to confirming that the primary chip has finished executing corresponding subtasks before the synchronization command, changing a bit, corresponding to the primary chip, in the primary synchronization register from the initial value to a target value, and changing a bit, corresponding to a secondary chip, in the primary synchronization register from the initial value to the target value after receiving the first synchronization signal sent by the secondary chip, until the N bits of the primary synchronization register are all changed to the target values after receiving the first synchronization signal sent by all of the at least one secondary chip; and querying value of the primary synchronization register, and in a case where all of the N bits of the primary synchronization register are the target values, confirming that both the chip itself and the (N−1) associated chips have finished executing the corresponding subtasks before the synchronization command in the current task queue.

For example, the chip is configured to communicate with the task initiator. The task processing method further includes: after completing a corresponding subtask of each task in the current task queue, sending a completion message to the task initiator to cause the task initiator to confirm whether each task is completed.

For example, the current task queue includes a first task, and the task initiator initializes task state of the first task as a value. After completing a corresponding subtask of each task in the current task queue, sending a completion message to the task initiator to cause the task initiator to confirm whether each task is completed includes: after completing a corresponding subtask of the first task, performing a computing operation on the task state to change the value of the task state. After all of the N chips have performed the computing operation on the task state, the value of the task state is changed to a completion value, so as to allow the task initiator to confirm whether the first task is completed based on whether the task state is the completion value.

For example, specific implementations and functions of this task processing method for a chip may refer to the above description related to the task processing method for a multi-chip module, and will not be repeated herein.

At least one embodiment of the present disclosure further provides a chip.

Figure 11:
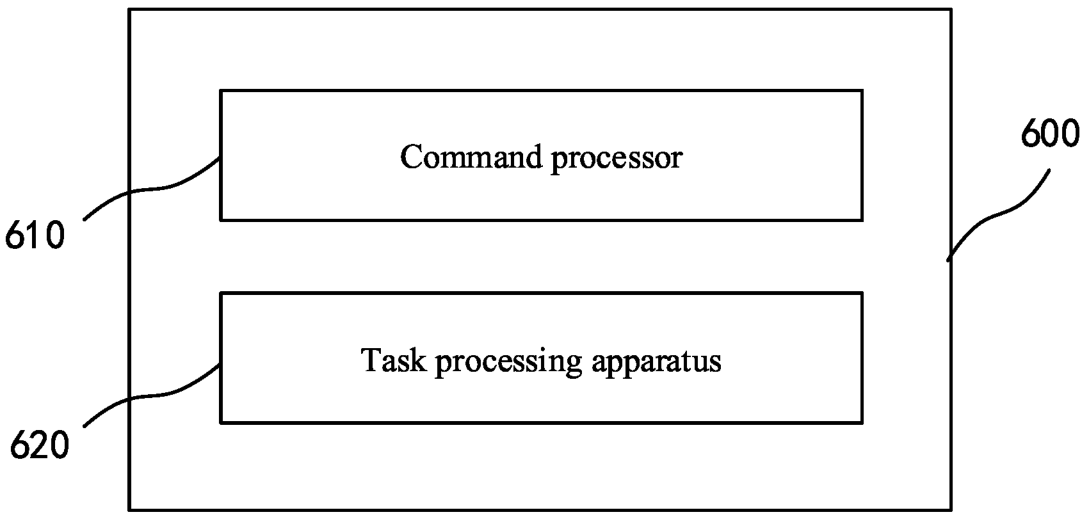
FIG. 11 shows a schematic diagram of a chip according to at least one embodiment of the present disclosure.

FIG. 11 shows a schematic diagram of a chip according to at least one embodiment of the present disclosure. As shown in FIG. 11, the chip 600 includes a command processor 610 and a task processing apparatus 620. The command processor 610 is configured to acquire subqueue information related to a current task queue, where the current task queue includes a plurality of tasks arranged in an execution order and a synchronization command between the plurality of tasks, each of the plurality of tasks includes N subtasks, and the N subtasks are configured to be executed by the chip and (N−1) associated chips respectively. The task processing apparatus 620 is configured to sequentially execute corresponding subtasks of the current task queue in accordance with the execution order based on the subqueue information. The command processor 610 is further configured to: in response to executing to the synchronization command, confirm whether the chip itself and the (N−1) associated chips have all finished executing corresponding subtasks before the synchronization command in the current task queue, and in response to confirming that the chip and the (N−1) associated chips have all finished executing the corresponding subtasks before the synchronization command in the current task queue, terminate the synchronization command to execute a corresponding subtask after the synchronization command, where N is an integer greater than 1.

For example, the command processor 610 may, for example, perform steps S510, S530, and S540 as described in FIG. 10, and the task processing device 620 may, for example, perform step S520 as described in FIG. 10.

For example, the components and structure of the chip 600 shown in FIG. 11 are merely exemplary and not limiting, and the chip may include more or fewer circuits, devices, units, modules, or apparatuses, as desired, and may, for example, further include a storage unit. Furthermore, the connection relationship between the individual circuits, devices, units, modules, or apparatuses is not limited, and may be defined based on actual needs. The specific way of constituting the individual circuits, devices, units, modules or apparatuses is not limited, and they may be constituted by analog devices according to the circuit principle, or by digital chips, or in other applicable ways.

For example, the specific realization and function of the chip may refer to the above descriptions related to the task processing method for a multi-chip module and the task processing method for a chip, which will not be repeated herein.

At least one embodiment of the present disclosure further provides a multi-chip module.

Figure 12:
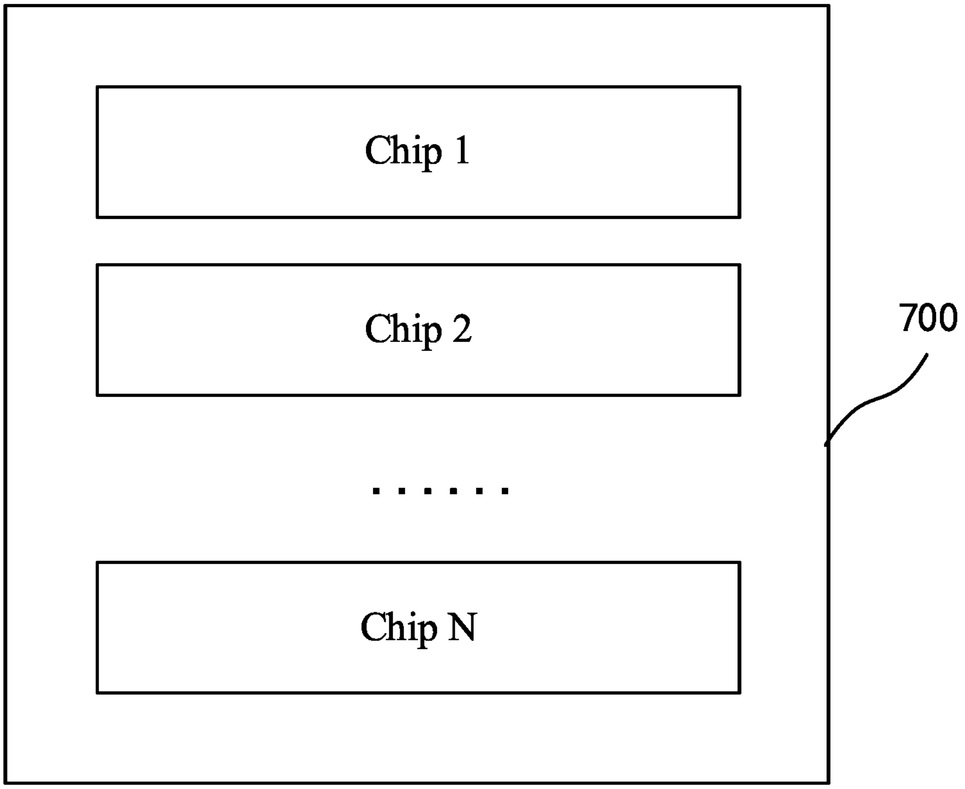
FIG. 12 shows a schematic diagram of a multi-chip module according to at least one embodiment of the present disclosure.

FIG. 12 shows a schematic diagram of a multi-chip module according to at least one embodiment of the present disclosure. As shown in FIG. 12, the multi-chip module 700 includes N chips in communication with each other: chip 1 to chip N. Each of the N chips is configured to: acquire subqueue information related to a current task queue, where the current task queue includes a plurality of tasks arranged in an execution order and a synchronization command between the plurality of tasks, each of the plurality of tasks includes N subtasks, and the N subtasks are configured to be executed by the N chips respectively; sequentially execute corresponding subtasks of the current task queue in the execution order based on respective subqueue information; and in response to executing to the synchronization command, confirm whether the N chips have all finished executing corresponding subtasks before the synchronization command in the current task queue, and in response to confirming that the N chips have all finished executing the corresponding subtasks before the synchronization command in the current task queue, terminate the synchronization command to execute a corresponding subtask after the synchronization command, where N is an integer greater than 1.

For example, the N chips may be the same or similar chips, and the N chips may have different functions. Each of the N chips includes a command processor or similar module to perform the synchronization. For example, one of the N chips is a CPU and the other chip is a GPU, and the subqueue information corresponding to the CPU is, for example, C1-C2-sync-C3, where C1, C2, and C3 each denote a subtask and sync denotes a synchronization command. The subqueue information corresponding to the GPU is, for example, G1-G2-sync-G3, where G1, G2 and G3 each denote a subtask and sync denotes a synchronization command. The multi-chip module of the embodiment of the present disclosure may ensure that C1, C2 in the CPU and G1, G2 in the GPU are completed before causing the CPU and GPU to execute C3 and G3, respectively.

For example, the specific implementations and functions of the multi-chip module may refer to the above description related to the task processing method for a multi-chip module, and will not be repeated herein.

At least one embodiment of the present disclosure further provides an electronic device. The electronic device includes a task initiator and a multi-chip module.

The electronic device may be a server, a laptop computer, a desktop computer, a cell phone, a smart home device, and the like. The task initiator and the multi-chip module in the electronic device may refer to the relevant descriptions in the above embodiments and will not be repeated herein.

At least one embodiment of the present disclosure further provides an electronic device. The electronic device includes a processor and a memory, and the memory stores one or more computer program modules. The one or more computer program modules are configured to be executed by the processor to implement the data processing method described above (the task processing method for a multi-chip module or the task processing method for a chip).

Figure 13:
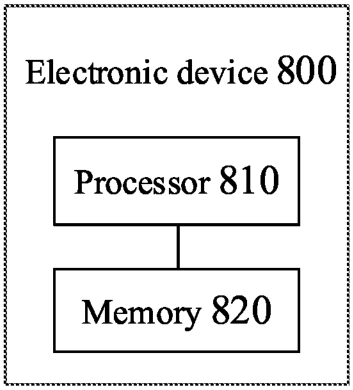
FIG. 13 shows a schematic block diagram of another electronic device according to at least one embodiment of the present disclosure.

FIG. 13 illustrates a schematic block diagram of an electronic device provided by some embodiments of the present disclosure. As illustrated in FIG. 13, the electronic device 800 includes a processor 810 and a memory 820. The memory 820 is configured to store non-transitory computer-readable instructions (e.g., one or more computer program modules). The processor 810 is configured to execute the non-transitory computer-readable instructions, and when the non-transitory computer-readable instructions are executed by the processor 810, one or more steps in the task processing method described above are performed. The memory 820 and the processor 810 may be interconnected by a bus system and/or other forms of connection mechanisms (not illustrated). The specific realization of each step of the task processing method and related explanations can be found in the embodiment of the task processing method described above, and the repetition will not be repeated here.

It should be noted that the components of the electronic device 800 shown in FIG. 13 are exemplary and not limiting, and the electronic device 800 may have other components as needed for practical applications.

For example, the processor 810 and the memory 820 may communicate with each other directly or indirectly.

For example, the processor 810 and the memory 820 may communicate via a network. The network may include a wireless network, a wired network, and/or any combination of a wireless network and a wired network. The processor 810 and the memory 820 may also communicate with each other via a system bus, which is not limited by the disclosure.

For example, the processor 810 and the memory 820 may be set up on the server side (or in the cloud).

For example, the processor 810 may control other components in the electronic device 800 to perform desired functions. For example, the processor 810 is a central processing unit (CPU), a graphics processing unit (GPU), or other forms of processing units having data processing capabilities and/or program execution capabilities. For example, the central processing unit (CPU) may be an X86 or ARM architecture, and the like. The processor 810 may be a general-purpose processor or a special-purpose processor, and can control other components in the electronic device 400 to perform desired functions.

For example, the memory 820 includes any combination of one or more computer program products, which may include various forms of computer-readable storage media, such as volatile memory and/or non-volatile memory. The volatile memory may include, for example, random access memory (RAM) and/or cache memory, etc. The non-volatile memory may include, for example, read-only memory (ROM), hard disk, erasable programmable read-only memory (EPROM), compact disk read-only memory (CD-ROM), USB memory, flash memory, and the like. One or more computer program modules may be stored on the computer-readable storage medium, and the processor 810 can execute one or more computer program modules to achieve various functions of the electronic device 800. Various application programs, various data, and various data used and/or generated by the application programs may also be stored in the computer-readable storage medium.

For example, in some embodiments, the electronic device 800 may be a cell phone, a tablet computer, an electronic paper, a television, a monitor, a laptop computer, a digital photo frame, a navigator, a wearable electronic device, a smart home device, and the like.

It should be noted that, in the embodiments of the present disclosure, the specific functions and technical effects of the electronic device 800 may refer to the above description about the task processing method, which will not be repeated here.

Figure 14:
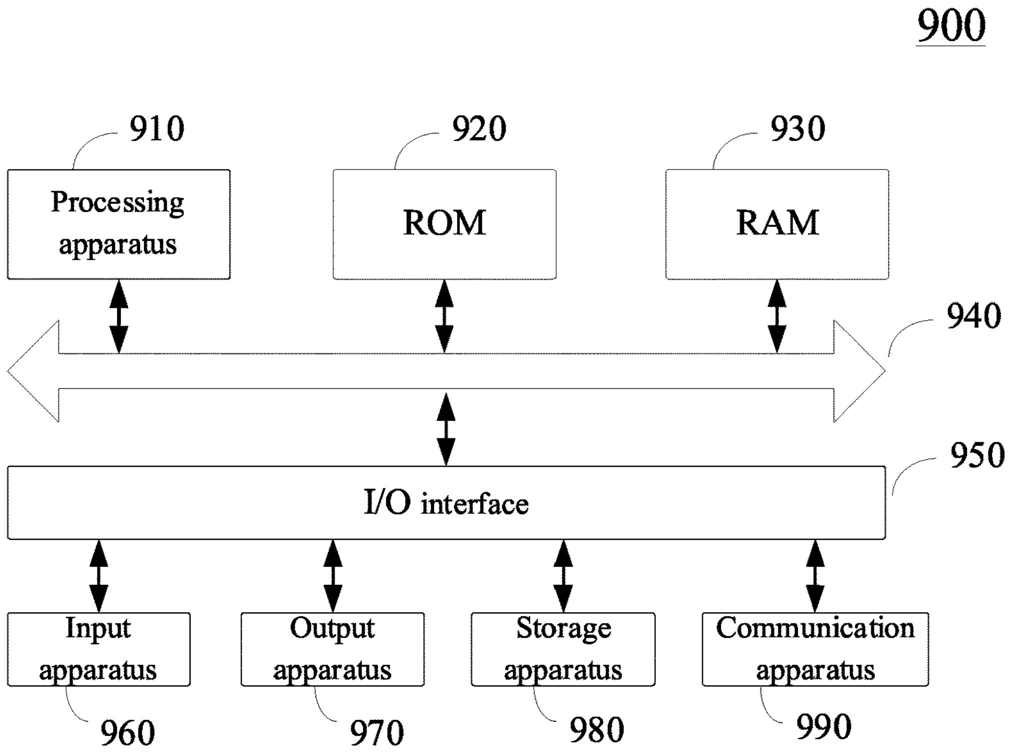
FIG. 14 shows a schematic block diagram of another electronic device according to at least one embodiment of the present disclosure.

FIG. 14 illustrates a schematic block diagram of another electronic device provided by some embodiments of the present disclosure. The electronic device 900 is, for example, suitable for implementing the task processing method provided by the embodiments of the present disclosure. The electronic device 900 may be a terminal device or the like. It should be noted that the electronic device 900 illustrated in FIG. 14 is only an example, which does not limit the functions and application scope of the embodiments of the present disclosure.

As illustrated in FIG. 14, the electronic device 900 includes a processing apparatus 910 (such as a central processing unit, a graphics processing unit, etc.) that can perform various appropriate actions and processes in accordance with a program stored in read-only memory (ROM) 920 or loaded from a storage apparatus 980 into random access memory (RAM) 930. In the RAM 930, various programs and data required for the operation of the electronic device 900 are also stored. The processing apparatus 910, the ROM 920 and the RAM 930 are connected to each other through a bus 940. An input/output (I/O) interface 950 is also connected to the bus 940.

Usually, the following apparatus may be connected to the I/O interface 950: an input apparatus 960 including, for example, a touch screen, a touch pad, a keyboard, a mouse, a camera, a microphone, an accelerometer, a gyroscope, or the like; an output apparatus 970 including, for example, a liquid crystal display (LCD), a loudspeaker, a vibrator, or the like; the storage apparatus 980 including, for example, a magnetic tape, a hard disk, or the like; and a communication apparatus 990. The communication apparatus 990 may allow the electronic device 900 to be in wireless or wired communication with other devices to exchange data. While FIG. 14 illustrates the electronic device 900 having various apparatuses, it should be understood that not all of the illustrated apparatuses are necessarily implemented or included, and the electronic device 900 may alternatively implement or have more or fewer apparatuses.

For example, according to the embodiments of the present disclosure, the task processing method described above can be implemented as a computer software program. For example, the embodiments of the present disclosure include a computer program product, which includes a computer program carried by a non-transitory computer-readable medium, and the computer program includes program codes for performing the task processing method described above. In such embodiments, the computer program may be downloaded online through the communication apparatus 990 and installed, or may be installed from the storage apparatus 980, or may be installed from the ROM 920. When the computer program is executed by the processing apparatus 910, the functions defined in the task processing method provided by the embodiments of the present disclosure can be achieved.

At least one embodiment of the present disclosure further provides a computer-readable storage medium for storing non-transitory computer-readable instructions, and when the non-transitory computer-readable instructions are executed by a computer, the above-mentioned task processing method is achieved.

Figure 15:
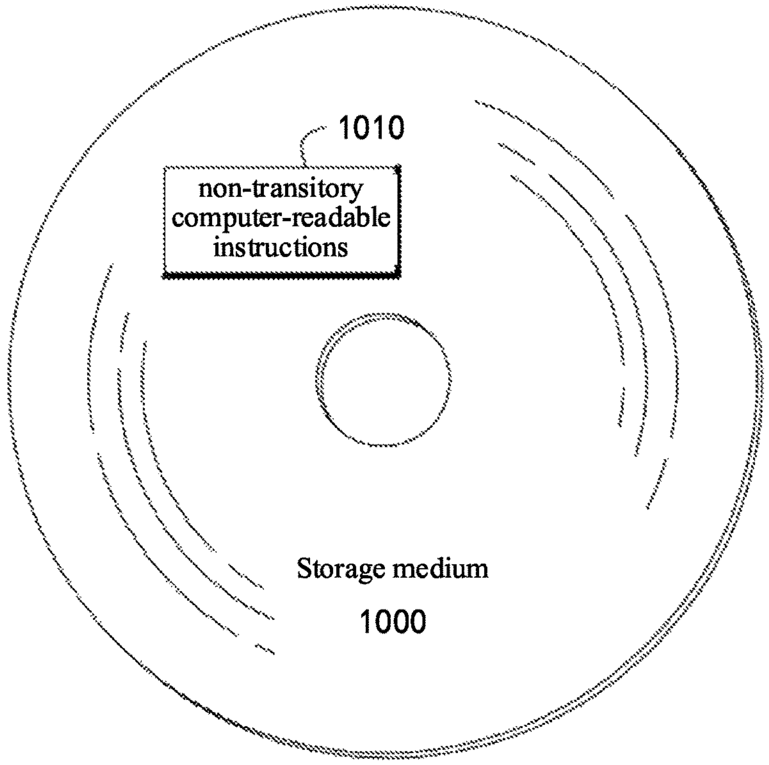
FIG. 15 shows a schematic diagram of a computer-readable storage medium according to at least one embodiment of the present disclosure.

FIG. 15 illustrates a schematic diagram of a storage medium provided by some embodiments of the present disclosure. As illustrated in FIG. 15, the storage medium 1000 is configured to store non-transitory computer-readable instructions 1010. For example, when the non-transitory computer-readable instructions 1010 are executed by a computer, one or more steps in the task processing method described above may be performed.

For example, the storage medium 1000 can be applied to the above-mentioned electronic device 800. For example, the storage medium 1000 is the memory 820 in the electronic device 800 illustrated in FIG. 13. For example, the relevant descriptions about the storage medium 1000 can refer to the corresponding descriptions of the memory 820 in the electronic device 800 illustrated in FIG. 13, which will not be repeated here.

The above description is only the explanation of a partial embodiment of the present disclosure and the used technical principle. It should be understood by those skilled in the art that the disclosure scope involved in the disclosure is not limited to the technical solution formed by the specific combination of the above technical features, but also covers other technical solutions formed by any combination of the above technical features or their equivalent features without departing from the above disclosed concept. For example, the technical solution formed by replacing the above features with (but not limited to) technical features with similar functions disclosed in the disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in a plurality of embodiments alone or in any suitable sub-combination.

Although the subject matter has been described in language specific to structural features and/or logical actions of methods, it should be understood that the subject matter defined in the appended claims is not necessarily limited to the specific features or actions described above. On the contrary, the specific features and actions described above are only example forms of realizing the claims.

For the present disclosure, the following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A task processing method for a multi-chip module, the multi-chip module comprises N chips, the method comprises:

acquiring, by each of the N chips, respective subqueue information related to a current task queue, wherein the current task queue comprises a plurality of tasks arranged in an execution order and a synchronization command between the plurality of tasks, each of the plurality of tasks comprises N subtasks, and the N subtasks are configured to be executed by the N chips respectively;

sequentially executing, by each of the N chips, corresponding subtasks of the current task queue in accordance with the execution order based on the respective subqueue information;

each of the N chips, in response to executing to the synchronization command, confirming whether the N chips have all finished executing corresponding subtasks before the synchronization command in the current task queue, and terminating the synchronization command to execute a corresponding subtask after the synchronization command in response to confirming that the N chips have all finished executing the corresponding subtasks before the synchronization command in the current task queue, wherein N is an integer greater than 1.

2. The method according to claim 1, wherein the N chips comprise a primary chip and at least one secondary chip;

each of the N chips, in response to executing to the synchronization command, confirming whether the N chips have all finished executing corresponding subtasks before the synchronization command in the current task queue comprises:

each of the at least one secondary chip, in response to executing to the synchronization command, confirming whether the secondary chip itself has finished executing corresponding subtasks before the synchronization command;

sending, by each of the at least one secondary chip, a first synchronization signal to the primary chip in response to confirming that the secondary chip itself has finished executing corresponding subtasks before the synchronization command; and terminating, by each of the at least one secondary chip, the synchronization command in response to receiving a second synchronizing signal sent by the primary chip;

wherein the second synchronization signal indicates that the primary chip has received the first synchronization signal sent by all of the at least one secondary chip.

3. The method according to claim 2, wherein each of the N chips, in response to executing to the synchronization command, confirming whether the N chips have all finished executing corresponding subtasks before the synchronization command in the current task queue comprises:

confirming, by the primary chip, whether the primary chip has finished executing corresponding subtasks before the synchronization command in response to the primary chip executing to the synchronization command;

checking, by the primary chip, whether the first synchronization signal sent by all of the at least one secondary chip has been received in response to confirming that the primary chip has finished executing corresponding subtasks before the synchronization command; and sending, by the primary chip, the second synchronization signal to each of the at least one secondary chip and terminating the synchronization command in a case where the first synchronization signal sent by all of the at least one secondary chip has been received.

4. The method according to claim 2, wherein each of the at least one secondary chip has a secondary synchronization register related to the current task queue, the secondary synchronization register comprises a bit corresponding to the secondary chip and a bit corresponding to the primary chip, and the bit corresponding to the secondary chip and the bit corresponding to the primary chip both have an initial value;

for each of the at least one secondary chip, that sending a first synchronization signal to the primary chip in response to confirming that the secondary chip itself has finished executing corresponding subtasks before the synchronization command comprises:

in response to confirming that the secondary chip itself has finished executing corresponding subtasks before the synchronization command, changing the bit, corresponding to the secondary chip, in the secondary synchronization register from the initial value to a target value, and sending the first synchronization signal to the primary chip;

terminating the synchronization command in response to receiving a second synchronizing signal sent by the primary chip comprises:

in response to receiving the second synchronization signal sent by the primary chip, changing the bit, corresponding to the primary chip, in the secondary synchronization register from the initial value to the target value; and querying value of the secondary synchronization register, and terminating the synchronization command in a case where the bit corresponding to the secondary chip and the bit corresponding to the primary chip in the secondary synchronization register are both the target value.

5. The method according to claim 3, wherein the primary chip has a primary synchronization register related to the current task queue, the primary synchronization register comprises N bits corresponding to the N chips respectively, and the N bits each have an initial value;

for the primary chip, that checking whether the first synchronization signal sent by all of the at least one secondary chip has been received in response to confirming that the primary chip has finished executing corresponding subtasks before the synchronization command comprises:

in response to confirming that the primary chip has finished executing corresponding subtasks before the synchronization command, changing a bit, corresponding to the primary chip, in the primary synchronization register from the initial value to a target value, and changing a bit, corresponding to a secondary chip, in the primary synchronization register from the initial value to the target value after receiving the first synchronization signal sent by the secondary chip, until the N bits of the primary synchronization register are all changed to the target value after receiving the first synchronization signal sent by all of the at least one secondary chip; and querying value of the primary synchronization register, and confirming that the first synchronization signal sent by all of the at least one secondary chip has been received in a case where all the N bits of the primary synchronization register are the target value.

6. The method according to claim 1, wherein the N chips are configured to communicate with a task initiator;

the task processing method further comprises:

each of the N chips, after completing a corresponding subtask of each task in the current task queue, sending a completion message to the task initiator to cause the task initiator to confirm whether each task is completed.

7. The method according to claim 6, wherein the current task queue comprises a first task, and the task initiator initializes task state of the first task as a value;

each of the N chips, after completing a corresponding subtask of each task in the current task queue, sending a completion message to the task initiator to cause the task initiator to confirm whether each task is completed comprises:

each of the N chips, after completing a corresponding subtask of the first task, performing a computing operation on the task state to change the value of the task state until, after all the N chips have performed the computing operation, the task state is changed to a completion value, to cause the task initiator to confirm whether the first task is completed based on whether the task state is the completion value.

8. A task processing method for a chip, comprising:

acquiring subqueue information related to a current task queue, wherein the current task queue comprises a plurality of tasks arranged in an execution order and a synchronization command between the plurality of tasks, each of the plurality of tasks comprises N subtasks, and the N subtasks are configured to be executed by the chip and (N−1) associated chips respectively;

sequentially executing corresponding subtasks of the current task queue in accordance with the execution order based on the subqueue information;

in response to executing to the synchronization command, confirming whether the chip and the (N−1) associated chips have all finished executing corresponding subtasks before the synchronization command in the current task queue; and in response to confirming that the chip and the (N−1) associated chips have all finished executing the corresponding subtasks before the synchronization command in the current task queue, terminating the synchronization command to execute a corresponding subtask after the synchronization command, wherein N is an integer greater than 1.

9. The method according to claim 8, wherein in a case where the (N−1) associated chips comprise a primary chip and the chip is a secondary chip related to the primary chip, in response to executing to the synchronization command, confirming whether the chip and the (N−1) associated chips have all finished executing corresponding subtasks before the synchronization command in the current task queue comprises:

in response to executing to the synchronization command, confirming whether the chip has finished executing corresponding subtasks before the synchronization command;

in response to confirming that the chip has finished executing corresponding subtasks before the synchronization command, sending a first synchronization signal to the primary chip; and in response to receiving a second synchronizing signal sent by the primary chip, terminating the synchronization command;

wherein the second synchronization signal indicates that the primary chip has received the first synchronization signal sent by all the secondary chip related to the primary chip.

10. The method according to claim 8, wherein in a case where the chip is a primary chip and each of the (N−1) associated chips is a secondary chip of the primary chip, in response to executing to the synchronization command, confirming whether the chip and the (N−1) associated chips have all finished executing corresponding subtasks before the synchronization command in the current task queue comprises:

in response to executing to the synchronization command, confirming whether the chip has finished executing corresponding subtasks before the synchronization command;

in response to confirming that the chip has finished executing corresponding subtasks before the synchronization command, checking whether first synchronization signals sent by all of the (N−1) associated chips has been received; and sending a second synchronization signal to each of the (N−1) associated secondary chips and terminating the synchronization command in a case where the first synchronization signals sent by all of the (N−1) associated chips have been received.

11. A chip, comprising:

a command processor, configured to acquire subqueue information related to a current task queue, wherein the current task queue comprises a plurality of tasks arranged in an execution order and a synchronization command between the plurality of tasks, each of the plurality of tasks comprises N subtasks, and the N subtasks are configured to be executed by the chip and (N−1) associated chips respectively; and a task processing apparatus, configured to sequentially execute corresponding subtasks of the current task queue in accordance with the execution order based on the subqueue information;

wherein the command processor is further configured to:

in response to executing to the synchronization command, confirm whether the chip and the (N−1) associated chips have all finished executing corresponding subtasks before the synchronization command in the current task queue; and in response to confirming that the chip and the (N−1) associated chips have all finished executing the corresponding subtasks before the synchronization command in the current task queue, terminate the synchronization command to execute a corresponding subtask after the synchronization command, wherein N is an integer greater than 1.

12. A multi-chip module, comprising N chips, wherein each of the N chips is configured to:

acquire subqueue information related to a current task queue, wherein the current task queue comprises a plurality of tasks arranged in an execution order and a synchronization command between the plurality of tasks, each of the plurality of tasks comprises N subtasks, and the N subtasks are configured to be executed by the N chips respectively;

sequentially execute corresponding subtasks of the current task queue in the execution order based on the respective subqueue information; and in response to executing to the synchronization command, confirm whether the N chips have all finished executing corresponding subtasks before the synchronization command in the current task queue, and in response to confirming that the N chips have all finished executing the corresponding subtasks before the synchronization command in the current task queue, terminate the synchronization command to execute a corresponding subtask after the synchronization command, wherein N is an integer greater than 1.

13. An electronic device, comprising:

a task initiator; and the multi-chip module of claim 12.

14. An electronic device, comprising:

a processor; and a memory, storing one or more computer program modules;

wherein the one or more computer program modules are configured to be executed by the processor to implement the task processing method of claim 1.

15. A computer-readable storage medium, storing a non-transitory computer-readable instruction, the non-transitory computer-readable instruction, when executed by a computer, implements the task processing method of claim 1.

16. The method according to claim 3, wherein each of the at least one secondary chip has a secondary synchronization register related to the current task queue, the secondary synchronization register comprises a bit corresponding to the secondary chip and a bit corresponding to the primary chip, and the bit corresponding to the secondary chip and the bit corresponding to the primary chip both have an initial value;

for each of the at least one secondary chip, that sending a first synchronization signal to the primary chip in response to confirming that the secondary chip itself has finished executing corresponding subtasks before the synchronization command comprises:

in response to confirming that the secondary chip itself has finished executing corresponding subtasks before the synchronization command, changing the bit, corresponding to the secondary chip, in the secondary synchronization register from the initial value to a target value, and sending the first synchronization signal to the primary chip;

terminating the synchronization command in response to receiving a second synchronizing signal sent by the primary chip comprises:

in response to receiving the second synchronization signal sent by the primary chip, changing the bit, corresponding to the primary chip, in the secondary synchronization register from the initial value to the target value; and querying value of the secondary synchronization register, and terminating the synchronization command in a case where the bit corresponding to the secondary chip and the bit corresponding to the primary chip in the secondary synchronization register are both the target value.

17. The method according to claim 4, wherein the primary chip has a primary synchronization register related to the current task queue, the primary synchronization register comprises N bits corresponding to the N chips respectively, and the N bits each have an initial value;

for the primary chip, that checking whether the first synchronization signal sent by all of the at least one secondary chip has been received in response to confirming that the primary chip has finished executing corresponding subtasks before the synchronization command comprises:

in response to confirming that the primary chip has finished executing corresponding subtasks before the synchronization command, changing a bit, corresponding to the primary chip, in the primary synchronization register from the initial value to a target value, and changing a bit, corresponding to a secondary chip, in the primary synchronization register from the initial value to the target value after receiving the first synchronization signal sent by the secondary chip, until the N bits of the primary synchronization register are all changed to the target value after receiving the first synchronization signal sent by all of the at least one secondary chip; and querying value of the primary synchronization register, and confirming that the first synchronization signal sent by all of the at least one secondary chip has been received in a case where all the N bits of the primary synchronization register are the target value.

18. The method according to claim 2, wherein the N chips are configured to communicate with a task initiator;

the task processing method further comprises:

each of the N chips, after completing a corresponding subtask of each task in the current task queue, sending a completion message to the task initiator to cause the task initiator to confirm whether each task is completed.

19. The method according to claim 18, wherein the current task queue comprises a first task, and the task initiator initializes task state of the first task as a value;

each of the N chips, after completing a corresponding subtask of each task in the current task queue, sending a completion message to the task initiator to cause the task initiator to confirm whether each task is completed comprises:

each of the N chips, after completing a corresponding subtask of the first task, performing a computing operation on the task state to change the value of the task state until, after all the N chips have performed the computing operation, the task state is changed to a completion value, to cause the task initiator to confirm whether the first task is completed based on whether the task state is the completion value.

* * * * *